US 11,522,601 B2

(12) United States Patent
Omote et al.

(10) Patent No.: US 11,522,601 B2
(45) Date of Patent: Dec. 6, 2022

(54) DYNAMIC SITE DIVERSITY IN HAPS COMMUNICATION SYSTEM

(71) Applicant: HAPSMobile Inc., Tokyo (JP)

(72) Inventors: Hideki Omote, Tokyo (JP); Liang Zhang, Tokyo (JP); Sho Kimura, Tokyo (JP)

(73) Assignee: HAPSMobile Inc., Tokyo (JP)

( * ) Notice: Subject to any disclaimer, the term of this patent is extended or adjusted under 35 U.S.C. 154(b) by 0 days.

(21) Appl. No.: 17/623,419

(22) PCT Filed: Mar. 18, 2020

(86) PCT No.: PCT/JP2020/012058
§ 371 (c)(1),
(2) Date: Dec. 28, 2021

(87) PCT Pub. No.: WO2021/014684
PCT Pub. Date: Jan. 28, 2021

(65) Prior Publication Data
US 2022/0209848 A1  Jun. 30, 2022

(30) Foreign Application Priority Data

Jul. 23, 2019 (JP) .............................. JP2019-135682

(51) Int. Cl.
*H04Q 11/00* (2006.01)
*H04B 7/185* (2006.01)
*H04W 16/28* (2009.01)

(52) U.S. Cl.
CPC ........ *H04B 7/18504* (2013.01); *H04W 16/28* (2013.01)

(58) Field of Classification Search
CPC ............ B64C 39/024; B64C 2201/027; H04B 7/18504; H04B 7/18506; H04B 7/0617;
(Continued)

(56) References Cited

U.S. PATENT DOCUMENTS 11,057,856 B2  7/2021  Hoshino
2016/0046387 A1  2/2016  Frolov et al.
(Continued)

FOREIGN PATENT DOCUMENTS

JP  2017-195493 A  10/2017
JP  6521123  5/2019
(Continued)

OTHER PUBLICATIONS

3rd Generation Partnership Project; Technical Specification Group Radio Access Network; Solutions for NR to support non-terrestrial networks (NTN), (Release 16), 3GPP TR 38.821 V0.5.0, Apr. 2019, Sep. 6, 2022.

*Primary Examiner* — Khalid W Shaheed
(74) *Attorney, Agent, or Firm* — Muirhead and Saturnelli, LLC

(57) ABSTRACT

It is suppressed of a deterioration of communication quality of a service link (SL) due to a local propagation-loss increasing part in a radio propagation path of a feeder link (FL) between an aerial-floating type communication relay apparatus and a gateway (GW) station. When the local propagation-loss increasing part occurs in the radio propagation path of the feeder link between the gateway station and the communication relay apparatus or when an occurrence of the propagation-loss increasing part is predicted, the communication relay apparatus is moved to a position capable of suppressing or avoiding the deterioration of communication quality due to the propagation-loss increasing part in the radio propagation path of the feeder link.

20 Claims, 21 Drawing Sheets

(58) Field of Classification Search
CPC .............. H04B 7/0695; H04B 7/18508; H04B 7/0413; H04B 7/2041; H04B 7/18513; H04B 17/318
See application file for complete search history.

(56) References Cited

U.S. PATENT DOCUMENTS

| | | | |
|---|---|---|---|
| 2017/0081026 A1 | 3/2017 | Winn et al. | |
| 2017/0111102 A1* | 4/2017 | Fan ....................... | H04W 4/023 |
| 2017/0229023 A1* | 8/2017 | Connor ................ | G08G 5/0052 |
| 2017/0309088 A1* | 10/2017 | Arya ....................... | G07C 5/008 |
| 2018/0035263 A1* | 2/2018 | Titus ..................... | H04W 64/00 |
| 2018/0152870 A1 | 5/2018 | Park | |

FOREIGN PATENT DOCUMENTS

| | | |
|---|---|---|
| JP | 2019-121909 A | 7/2019 |
| WO | WO 2017/019595 A1 | 2/2017 |
| WO | WO 2019/135369 A1 | 7/2019 |

\* cited by examiner

DYNAMIC SITE DIVERSITY IN HAPS COMMUNICATION SYSTEM

TECHNICAL FIELD

The present invention relates to a dynamic site diversity in a HAPS system suitable for constructing a three-dimensional network.

BACKGROUND ART

There is conventionally known a communication relay apparatus such as a high altitude platform station (HAPS) (also referred to as "high altitude pseudo satellite") that can float and stay in an airspace (for example, see Patent Literature 1). A communication line in this aerial-floating type communication relay apparatus is configured with a feeder link between the communication relay apparatus and a gateway (GW) station on a mobile communication network side, and a service link between the communication relay apparatus and a terminal apparatus.

CITATION LIST

Patent Literature

Patent Literature 1: U.S. Patent Application Publication No. 2016/0046387.

SUMMARY OF INVENTION

Technical Problem

If there is a local rainfall or snowfall, etc. in a radio propagation path of the feeder link between the aerial-floating type communication relay apparatus and a GW station on the ground, a radio-signal attenuation amount (propagation loss) of the feeder link may increase and a communication quality may deteriorate, and a communication quality of the service link between the terminal apparatus of a cell corresponding to the feeder link and the communication relay apparatus may deteriorate.

Solution to Problem

An aerial-staying type communication relay apparatus according to an aspect of the present invention comprises a feeder-link communication section that performs a radio communication of a feeder link to and from a gateway station, a service-link communication section that performs a radio communication of a service link to and from a terminal apparatus, a drive section that moves the communication relay apparatus, and a drive control section that controls so as to move the communication relay apparatus to a position capable of suppressing or avoiding a deterioration of communication quality due to a propagation-loss increasing part in a radio propagation path of the feeder link between the gateway station and the communication relay apparatus, when the local propagation-loss increasing part occurs in the radio propagation path of the feeder link, or when an occurrence of the propagation-loss increasing part is predicted.

In the foregoing communication relay apparatus, the communication relay apparatus may control a directional beam of the feeder-link communication section so as to direct to the gateway station by mechanically driving an antenna for feeder link or processing a signal in the feeder link.

In the foregoing communication relay apparatus, the communication relay apparatus may move within a range capable of maintaining a position and shape of a footprint on the ground or on the sea of a cell of the service link.

In the foregoing communication relay apparatus, the communication relay apparatus may control a directional beam of the service-link communication section so as to maintain a position and shape of a footprint on the ground or on the sea of a cell of the service link in a position and shape of the footprint before a movement of the communication relay apparatus, after the movement of the communication relay apparatus or during the movement of the communication relay apparatus.

In the foregoing communication relay apparatus, the communication relay apparatus may acquire weather information that affects the occurrence of the local propagation-loss increasing part in the radio propagation path of the feeder link, and may move to a position capable of suppressing or avoiding the deterioration of the communication quality in the radio propagation path of the feeder link, based on the weather information.

In the foregoing communication relay apparatus, the communication relay apparatus may detect or predict a temporal fluctuation or spatial fluctuation in a weather affecting the occurrence of the local propagation-loss increasing part in the radio propagation path of the feeder link, and may move to a position capable of suppressing or avoiding the deterioration of the communication quality in the radio propagation path of the feeder link, based on a result of the detection or prediction of the temporal fluctuation or spatial fluctuation in the weather.

In the foregoing communication relay apparatus, the communication relay apparatus may measure a propagation loss or a radio-signal attenuation amount in a radio propagation path of plural links, including the feeder link to and from the gateway station and a link to and from a radio apparatus disposed on the ground or on the sea so as to be located at a location different from the gateway station, and may detect or predict the spatial fluctuation in the weather based on a result of the measurement.

In the foregoing communication relay apparatus, the communication relay apparatus may measure a propagation loss or a radio-signal attenuation amount in the radio propagation path of the feeder link between the gateway station and the communication relay apparatus, and may move to a position capable of suppressing or avoiding the deterioration of the communication quality in the radio propagation path of the feeder link, based on a result of the measurement.

In the foregoing communication relay apparatus, the communication relay apparatus may measure a radio-signal attenuation amount, a propagation loss or a communication quality of the feeder link, at a destination to which the communication relay apparatus moves.

In the foregoing communication relay apparatus, when another aerial-staying type communication relay apparatus is located around the communication relay apparatus, the communication relay apparatus may move in cooperation with the other communication relay apparatus so that the communication relay apparatus and the other communication relay apparatus are optimally disposed with each other.

In the foregoing communication relay apparatus, when another aerial-staying type communication relay apparatus of a different management and operation entity is located around the communication relay apparatus, the communication relay apparatus may instruct a moving destination to the other communication relay apparatus.

A gateway station according to another aspect of the present invention is a gateway station for performing radio communication with an aerial-staying type communication relay apparatus. The gateway station comprises a network communication section that performs a communication to and from a communication network, a feeder-link communication section that performs a radio communication of a feeder link to and from the communication relay apparatus, a drive section that moves the gateway station, and a drive control section that controls so as to move the gateway station to a position capable of suppressing or avoiding a local deterioration of communication quality due to a propagation-loss increasing part in a radio propagation path of the feeder link between the gateway station and the communication relay apparatus, when the local propagation-loss increasing part occurs in the radio propagation path, or when an occurrence of the propagation-loss increasing part is predicted.

In the foregoing gateway station, the gateway station may control a directional beam of the feeder-link communication section so as to direct to the communication relay apparatus by mechanically driving an antenna for feeder link or processing a signal in the feeder link.

In the foregoing gateway station, the communication relay apparatuses in connection, which perform a feeder-link radio communication to and from the gateway station and the feeder link, are plural, and the gateway station may move to an optimum position for the plural communication relay apparatuses in connection.

In the foregoing gateway station, when another aerial-staying type communication relay apparatus of a different management and operation entity is located around the communication relay apparatus in connection performing a feeder-link radio communication with the gateway station, the gateway station may move to an optimum position for both of the communication relay apparatus in connection and the other communication relay apparatus.

In the foregoing gateway station, the gateway station may acquire weather information that affects the occurrence of the local propagation-loss increasing part in the radio propagation path of the feeder link, and may move to a position capable of suppressing or avoiding the deterioration of the communication quality in the radio propagation path of the feeder link, based on the weather information.

In the foregoing gateway station, the gateway station may detect or predict a temporal fluctuation or spatial fluctuation in a weather affecting the occurrence of the local propagation-loss increasing part in the radio propagation path of the feeder link, and may move to a position capable of suppressing or avoiding the deterioration of the communication quality in the radio propagation path of the feeder link, based on a result of the detection or prediction of the temporal fluctuation or spatial fluctuation in the weather.

In the foregoing gateway station, the gateway station may measure a propagation loss or a radio-signal attenuation amount in the radio propagation path of the feeder link between the gateway station and the communication relay apparatus, and may move to a position capable of suppressing or avoiding the deterioration of the communication quality in the radio propagation path of the feeder link, based on a result of the measurement.

In the foregoing gateway station, the gateway station may measure a radio-signal attenuation amount, a propagation loss, or a communication quality of the feeder link, at a destination to which the gateway station moves.

A communication system according to yet another aspect of the present invention is a communication system comprises any one of the foregoing communication relay apparatuses and any one of the foregoing gateway stations, and the communication system moves at least one of the communication relay apparatus and the gateway station to a position capable of suppressing or avoiding the deterioration of communication quality due to the propagation-loss increasing part in the radio propagation path of the feeder link.

In the foregoing communication system, at least one of the communication relay apparatus and the gateway station may be plural, and the communication system may simultaneously suppress or avoid the deterioration of communication quality due to the propagation-loss increasing part in radio propagation paths of plural feeder links.

In the foregoing communication system, the communication system may further comprise a remote control apparatus that transmits control information for moving to a position capable of suppressing or avoiding the deterioration of communication quality due to the propagation-loss increasing part in the radio propagation path of the feeder link, to at least one of the communication relay apparatus and the gateway station.

A program according to yet another aspect of the present invention is a program executed by a computer or a processor provided in an aerial-staying type communication relay apparatus. The program includes a program code for performing a radio communication of a feeder link to and from a gateway station, a program code for performing a radio communication of a service link to and from a terminal apparatus, and a program code for moving the communication relay apparatus to a position capable of suppressing or avoiding a deterioration of communication quality due to a the propagation-loss increasing part in a radio propagation path of the feeder link, when the local propagation-loss increasing part occurs in the radio propagation path, or when an occurrence of the propagation-loss increasing part is predicted.

A program according to yet another aspect of the present invention is a program executed by a computer or a processor provided in a movable aerial-floating type communication relay apparatus including a relay communication station that performs a radio communication of a service link to and from a terminal apparatus. The program includes a program code for performing a communication to and from a communication network, a program code for performing a radio communication of a feeder link to and the communication relay apparatus, and a program code for moving the gateway station to a position capable of suppressing or avoiding a deterioration of communication quality due to a propagation-loss increasing part in a radio propagation path of the feeder link, when the local propagation-loss increasing part occurs in the radio propagation path of the feeder link between the gateway station and the communication relay apparatus, or when an occurrence of the propagation-loss increasing part is predicted.

According to the present invention, it is possible to suppress a deterioration of communication quality of a service link due to an increase in local propagation loss (signal attenuation) in a radio propagation path of a feeder link between an aerial-floating type communication relay apparatus and a gateway station.

DESCRIPTION OF EMBODIMENTS

Hereinafter, embodiments of the present invention are described with reference to the drawings.

Figure 1A:
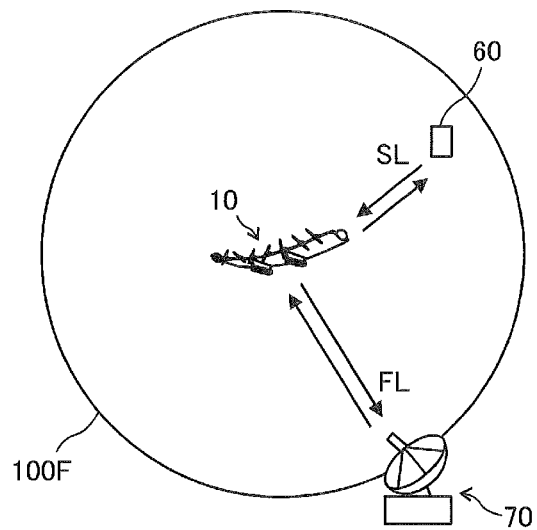
FIG. 1A is an illustration showing an example of an avoidance operation for a propagation-loss increasing part of a feeder link of a HAPS in a communication system according to an embodiment.
Figure 1B:
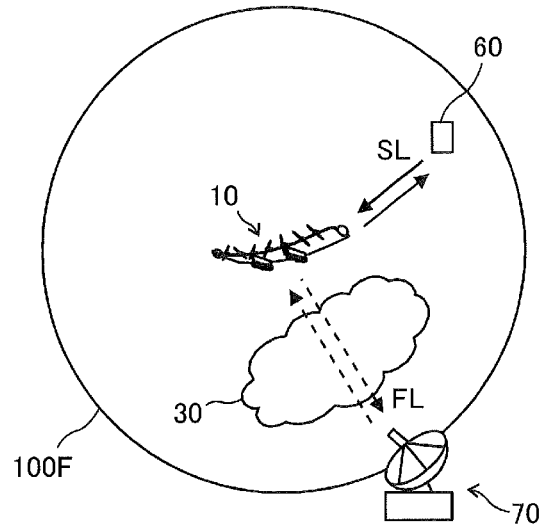
FIG. 1B is an illustration showing an example of an avoidance operation for a propagation-loss increasing part of a feeder link of a HAPS in a communication system according to an embodiment.
Figure 1C:
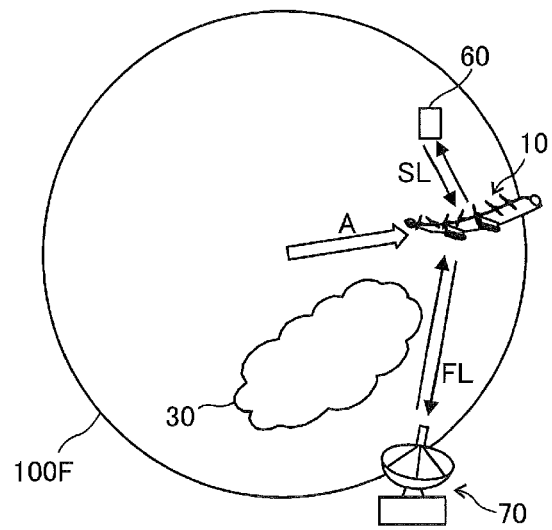
FIG. 1C is an illustration showing an example of an avoidance operation for a propagation-loss increasing part of a feeder link of a HAPS in a communication system according to an embodiment.

FIG. 1A to FIG. 1C are illustrations showing an example of an avoidance operation for a propagation-loss increasing part 30 of a feeder link FL of a HAPS 10 in a communication system according to an embodiment of the present invention.

As shown in FIG. 1, a communication system of the present embodiment is provided with a High-Altitude Platform Station (HAPS) (also called "high altitude pseudo satellite" or "stratified platform") 10 as an aerial-floating type communication relay apparatus (radio relay apparatus). The HAPS 10 is located in an airspace at a predetermined altitude, and forms a three-dimensional cell (three-dimensional area) in a cell-formation target airspace at a predetermined altitude. The HAPS 10 is a solar plane as a floating object that is controlled by autonomous control or external control so as to float or fly and to be located in an airspace (floating airspace) with high altitude of 100 [km] or less from the ground level or the sea level, wherein the solar plane is equipped with a relay communication station. The HAPS 10 may be another floating object such as an airship, wherein the floating object is equipped with a relay communication station.

It is noted that, in the following embodiments, although it is mainly described of some cases in which the relay communication station of the HAPS 10 has a function of a slave repeater, the relay communication station of the HAPS 10 may have a function of a base station of a mobile communication system (for example, eNodeB of the LTE or gNodeB of the next-generation such as the 5G).

The airspace where the HAPS 10 is located is, for example, a stratospheric airspace with an altitude of 11 [km] or more and 50 [km] or less on the ground (or on the water such as the sea or lake). The airspace may be an airspace with an altitude of 15 [km] or more and 25 [km] or less where weather conditions are relatively stable, and may be an airspace with altitude of about 20 [km] in particular.

The cell-formation target airspace, where is the target airspace for forming a three-dimensional cell with one or two or more HAPS 10 according to the communication system in the present embodiment, is, for example, an airspace with a predetermined altitude range (for example, altitude range of 50 [m] or more and 1000 [m] or less) located between the airspace where the HAPS 10 is located and a cell-formation spatial area near the ground level covered by a base station (for example, eNodeB of the LTE or gNodeB of the next-generation such as the 5G such as a conventional macro-cell base station.

It is noted that, the cell-formation target airspace where the three-dimensional cell in the present embodiment is formed may be an upper airspace over the sea, a river or a lake. Further, the three-dimensional cell formed by the HAPS 10 may be formed so as to reach the ground level or the sea level so that it can communicate with a terminal apparatus 60 as an user apparatus (mobile station) located on the ground or on the sea.

In FIG. 1A to FIG. 1C, a link between the HAPS 10 and the GW station 70 is referred to as a "feeder link" FL, and a link between the HAPS 10 and the terminal apparatus 60 is referred to as a "service link" SL. Further, a downlink of communication from the GW station 70 to the terminal apparatus 60 via the HAPS 10 is also referred to as a "forward link", and an uplink of communication from the terminal apparatus 60 to the GW station 70 via the HAPS 10 is also referred to as a "reverse link".

The relay communication station provided in the HAPS 10 forms plural beams for wirelessly communicating with the terminal apparatus 60 toward the ground by an antenna for service link (hereinafter referred to as "SL antenna"). An area A region through which a beam of the HAPS 10 passes is a three-dimensional cell, and a footprint 100F of the three-dimensional cell becomes a service area on the ground (or on the water such as the sea or lake) that provides a communication service of the terminal apparatus 60.

The terminal apparatus 60 may be not only a terminal apparatus located in a service area on the ground, etc. (or on the water such as the sea or lake), but also a communication terminal module incorporated in a drone that is an aircraft such as a small helicopter capable of remotely steering, or a user apparatus used by a user in an airplane.

The relay communication station of the HAPS 10 can perform a radio communication of the feeder link with, for example, a gateway station (also referred to as "feeder station", hereinafter referred to as "GW station") 70 on the ground (or on the sea) side. The relay communication station is connected to a core network of a mobile communication network via the GW station 70 disposed on the ground or on the sea and with which the relay communication station 21 is capable of performing a radio communication by an antenna for feeder link (hereinafter referred to as "FL antenna"). The feeder link communication between the relay communication station of the HAPS 10 and the GW station 70 may be performed by a radio communication using a radio wave such as a microwave, or by an optical communication using a laser light or the like.

The HAPS 10 may control a directional beam of the FL antenna so as to track the GW station 70 when moving in the airspace. By tracking the GW station 70 by the FL antenna, it is possible to suppress the deterioration of the communication quality of the feeder link due to the movement of the HAPS 10. As a control system of the directional beam of the FL antenna, it is capable of using various kinds of systems such as a gimbal system, an electric system (360-degrees beamforming control system), and an electric system (angle-limited beamforming control system+antenna switching).

The GW station 70 may control an antenna for feeder link (hereinafter referred to as "GW antenna") of its own station so as to track the HAPS 10 moving in the airspace. By tracking the HAPS 10 by the GW antenna, it is possible to suppress the deterioration of the communication quality of the feeder link due to the movement of the HAPS 10 even when the GW antenna having high directivity such as a parabolic antenna is used. As a control system of the directional beam of the GW antenna, it is capable of using various kinds of systems such as a gimbal system, an electric system (360-degrees beamforming control system), and an electric system (angle-limited beamforming control system+ antenna switching).

As shown in FIG. 1B, in the communication system including the HAPS 10 of the present embodiment, when a propagation-loss increasing part (also called "radio-signal increasing part" and also called "weather-sudden changing part" when a sudden weather change such as a guerrilla or a rainstorm is involved) 30, which is a space where a propagation loss (radio-signal attenuation amount) by a rainfall (guerrilla rainstorm), snowfall, storm, sandstorm, etc. is locally increased, is generated in a radio propagation path of the feeder link between the HAPS 10 and the GW station 70, the radio-signal attenuation amount of the feeder link may increase and the communication quality may deteriorate, and the communication quality of the service link between the terminal apparatus 60 of the three-dimensional cell corresponding to the feeder link and the HAPS 10 may deteriorate. In case that the communication quality deteriorates significantly, the service link communication may be interrupted.

Therefore, in the communication system of the present embodiment, when the propagation-loss increasing part 30 due to the guerrilla rainstorm or the like occurs in the radio propagation path of the feeder link as shown in FIG. 1C, the HAPS 10 is moved to a predetermined target position where the feeder link is not affected by the propagation-loss increasing part 30 as shown by the arrow A in the figure. As a result, it is possible to suppress or avoid the deterioration of the communication quality due to the increase in radio signal attenuation in the propagation-loss increasing part 30. Herein, in case that the propagation loss of the feeder link is large due to the influence of the guerrilla rainstorm in the entire range of the candidate positions of moving destination of the HAPS 10, the HAPS 10 may be moved to a position at which the influence of the guerrilla rainstorm is the least (a position where the increase of the propagation loss is the smallest) within the range.

It is noted that, the movement of the HAPS 10 to the target position may be performed not when the propagation-loss increasing part 30 occurs, but when the local radio-signal attenuation amount by the propagation-loss increasing part 30 of the feeder link increases to a predetermined threshold value or more, or when the communication quality of the feeder link decreases below a predetermined threshold value.

When it is predicted that the propagation-loss increasing part 30 will occur in the radio propagation path of the feeder link due to the guerrilla rainstorm or the like, the HAPS 10 may be moved to a position where the feeder link is not expected to be affected by the propagation-loss increasing part 30 as indicated with the arrow A in the figure and the deterioration of the communication quality by the propagation-loss increasing part 30 may be prevented.

The movement of the HAPS 10 may be performed within a range in which the position and shape of the footprint 100F on the ground or on the sea of the cell of the service link can be maintained. Further, after or during the movement of the HAPS 10, the directional beam of the service link may be controlled so as to maintain the position and shape of the footprint 100F of the cell of the service link to be the position and shape of the footprint before the movement of the HAPS 10.

The HAPS 10 may acquire weather information (for example, information on weather forecast) that affects the occurrence of the local propagation-loss increasing part 30 in the radio propagation path of the feeder link, and may move to the predetermined target position based on the weather information. The weather information on the area including the radio propagation path of the feeder link of the HAPS 10 can be acquired from, for example, a site of the weather-information providing organization such as the Japan Meteorological Agency or a private company on the Internet.

The HAPS 10 may also detect or predict a temporal fluctuation or spatial fluctuation in weather (for example, rainfall (guerrilla rainstorm), snowfall, storm, sandstorm, etc.) that affects the occurrence of the local propagation-loss increasing part 30 in the radio propagation path of the feeder link, and may move to the predetermined target position based on a result of the detection or prediction of the temporal fluctuation or spatial fluctuation in the weather. Herein, the HAPS 10 may measure the propagation loss or radio-signal attenuation amount in a multi-link radio propagation path including the feeder link FL to and from the GW station 70, and a link to and from a radio apparatus (for example, FWA: Fixed Wireless Access) provided on the ground or on the sea so as to be located at a different location from the GW station 70, and may detect or predict the spatial fluctuation in the weather based on a result of the measurement.

The HAPS 10 may measure a propagation loss or a radio-signal attenuation amount in the radio propagation path of the feeder link FL, and may move to the predetermined target position based on a result of the measurement. Further, the HAPS 10 may confirm whether the HAPS 10 has been able to move to a predetermined target position where the feeder link is not affected by the propagation-loss increasing part 30, by measuring the radio-signal attenuation amount, the propagation loss or the communication quality of the feeder link at the moving destination.

Moreover, when another HAPS is located in the vicinity of the HAPS 10, the HAPS 10 may move in cooperation with the other HAPS so that the HAPS 10 and the other HAPS are optimally disposed with each other. Herein, when another HAPS of a different communication carrier (management and operation entity) is located in the vicinity of the HAPS 10, the HAPS 10 may instruct a moving destination to the other HAPS 10.

Figure 2A:
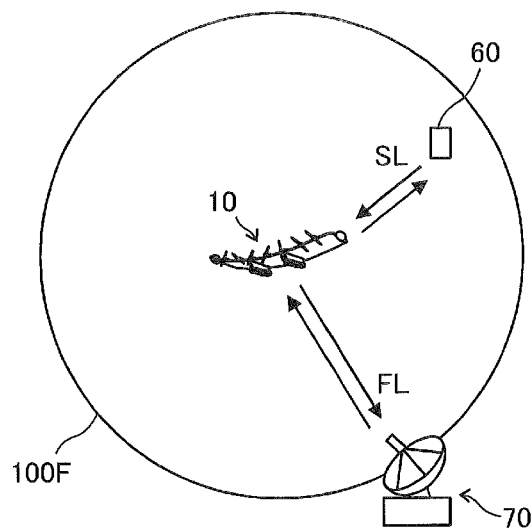
FIG. 2A is an illustration showing an example of an avoidance operation for a propagation-loss increasing part of a feeder link of a GW station in a communication system according to an embodiment.
Figure 2B:
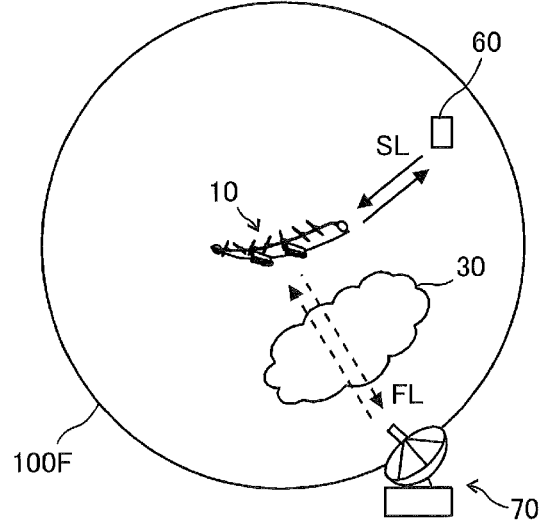
FIG. 2B is an illustration showing an example of an avoidance operation for a propagation-loss increasing part of a feeder link of a GW station in a communication system according to an embodiment.
Figure 2C:
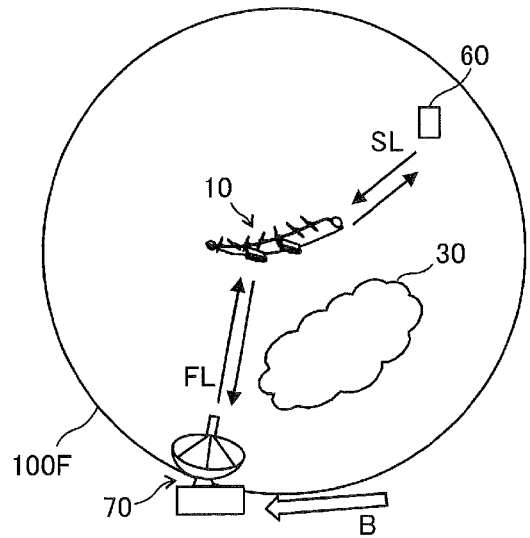
FIG. 2C is an illustration showing an example of an avoidance operation for a propagation-loss increasing part of a feeder link of a GW station in a communication system according to an embodiment.

FIG. 2A to FIG. 2C are illustrations showing an example of an avoidance operation for the propagation-loss increasing part of feeder link FL of GW station 70 in a communication system according to an embodiment. It is noted that, in FIG. 2A to FIG. 2C, the description of the parts common to those in the above-described FIG. 1A to FIG. 1C is omitted.

When the propagation-loss increasing part 30 occurs in the radio propagation path of the feeder link, although the HAPS 10 is moved to the position where the feeder link is not affected by the propagation-loss increasing part 30 in the examples of FIG. 1A to FIG. 1C described above, the GW station 70 may be moved to a predetermined target position where the feeder link is not affected by the propagation-loss increasing part 30 as shown by the arrow B in FIG. 2C. By the movement of the GW station 70, it is possible to suppress or avoid the deterioration of the communication quality due to the increase in radio signal attenuation in the propagation-loss increasing part 30. Herein, in case that the propagation loss of the feeder link is large due to the influence of the guerrilla rainstorm in the entire range of the candidate positions of moving destination of the GW station 70, the GW station 70 may be moved to a position at which the influence of the guerrilla rainstorm is the least (a position where the increase of the propagation loss is the smallest) within the range.

It is noted that, in the examples of FIG. 2A to FIG. 2C, the movement of the GW station 70 to the target position may be performed not when the propagation-loss increasing part 30 occurs, but when the local radio-signal attenuation amount by the propagation-loss increasing part 30 of the feeder link increases to a predetermined threshold value or more, or when the communication quality of the feeder link decreases below a predetermined threshold value.

When it is predicted that the propagation-loss increasing part 30 will occur in the radio propagation path of the feeder link due to the guerrilla rainstorm or the like, the GW station 70 may be moved to a position where it is predicted that the feeder link will not be affected by the propagation-loss increasing part 30 as indicated with the arrow B in the figure, and the deterioration of the communication quality by the propagation-loss increasing part 30 may be prevented.

In case that there are plural connected HAPSs 10 that are respectively performing a radio communication of the feeder link with the GW station 70, the GW station 70 may move to an optimum position (for example, a position where the communication quality to and from each HAPS 10 is all equal to or higher than a predetermined threshold value) for the plural connected HAPSs 10.

When another HAPS 10 of a communication carrier (management and operation entity) different from that of the connected HAPS 10 is located around the connected HAPS 10, which is performing a radio communication of the feeder link with the GW station 70, the GW station 70 may move to an optimum position (for example, a position where the communication quality to and from each HAPS is all equal to or higher than a predetermined threshold value) for both of the connected HAPS 10 and the other HAPS.

The GW station 70 may acquire weather information that affects the occurrence of the local propagation-loss increasing part 30 in the radio propagation path of the feeder link, and may move to the predetermined target position based on the weather information.

The GW station 70 may detect or predict a temporal fluctuation or spatial fluctuation in weather (for example, rainfall (guerrilla rainstorm), snowfall, storm, sandstorm, etc.) that affects the occurrence of the local propagation-loss increasing part 30 in the radio propagation path of the feeder link, and may move to the predetermined target position based on a result of the detection or the prediction of the temporal fluctuation or spatial fluctuation in the weather.

The GW station 70 may measure the propagation loss or the radio-signal attenuation amount in the radio propagation path of the feeder link FL, and may move to the predetermined target position based on a result of the measurement. The GW station 70 may also confirm whether the GW station 70 has been able to move to a predetermined target position where the feeder link is not affected by the propagation-loss increasing part 30, by measuring the radio-signal attenuation amount, the propagation loss or the communication quality of the feeder link at the moving destination.

Figure 3A:
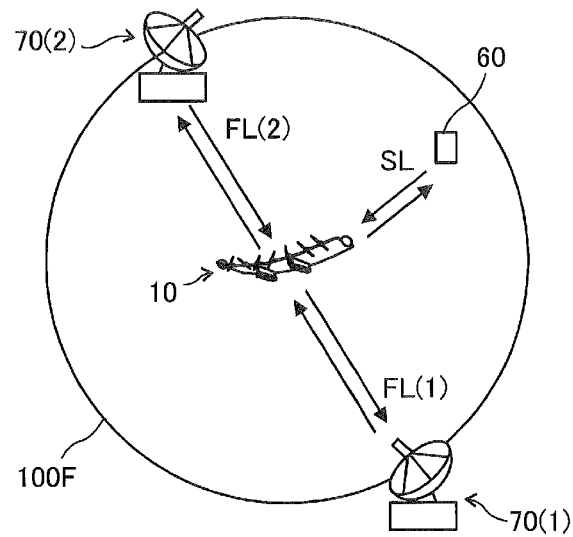
FIG. 3A is an illustration showing an example of a general site diversity without a movement of a HAPS or a GW station in a communication system including a HAPS and a GW station according to a reference example.
Figure 3B:
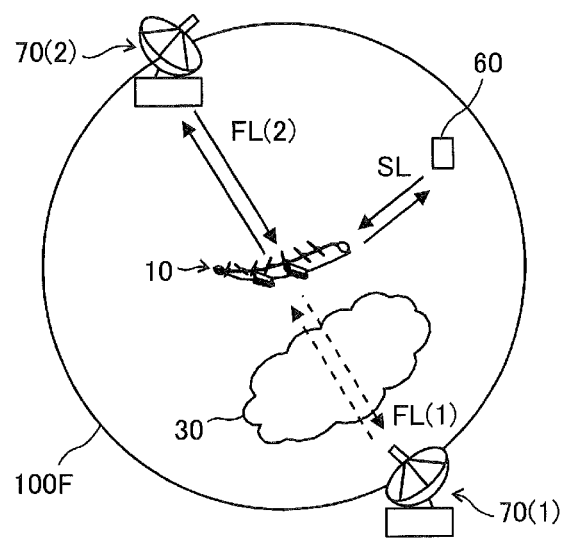
FIG. 3B is an illustration showing an example of a general site diversity without a movement of a HAPS or a GW station in a communication system including a HAPS and a GW station according to a reference example.

FIG. 3A and FIG. 3B are illustrations respectively showing an example of a general site diversity without a movement of a HAPS or a GW station in a communication system including the HAPS 10 and GW station 70 according to a reference example. The communication system of FIG. 3A is provided with plural GW stations 70(1) and 70(2) that are fixedly arranged at positions different from each other on the ground or on the sea so as to perform respectively radio communication of plural feeder links FL(1) and FL(2) to and from the HAPS 10. Even if the local propagation-loss increasing part 30 occurs in the radio propagation of one of the plural feeder links FL(1) and FL(2), for example, a radio propagation of a first feeder link FL(1) between a first GW station 70(1) and the HAPS 10 as shown in FIG. 3B, since the HAPS 10 can perform radio communication of a second feeder link FL(2) between a second GW station 70(2), a communication of the service link between the terminal apparatus 60 and the HAPS 10 can be continued.

However, in the communication system that performs the general site diversity in FIG. 3A and FIG. 3B, the propagation-loss increasing part that affects both of the plural feeder links FL(1) and FL(2) of the HAPS 10 may occur. For example, the propagation-loss increasing part such as local rainfall (guerrilla rainstorm), snowfall, storm and sandstorm may occur so as to cover the entire HAPS 10. In this case, the communication quality of the feeder links FL(1) and FL(2) may deteriorate due to the increase of the propagation loss (radio signal attenuation) of both of the radio propagation paths of the plural feeder links FL(1) and FL(2) of the HAPS 10, and the communication of the service link between the terminal apparatus 60 and the HAPS 10 may be interrupted. Therefore, in the communication system capable of performing such general site diversity, at least one of the HAPS 10, GW station 70(1) and GW station 70(2) may be moved so as to suppress or avoid deterioration of communication quality in the radio propagation path of at least one of the plural feeder links FL(1) and FL(2).

Figure 4A:
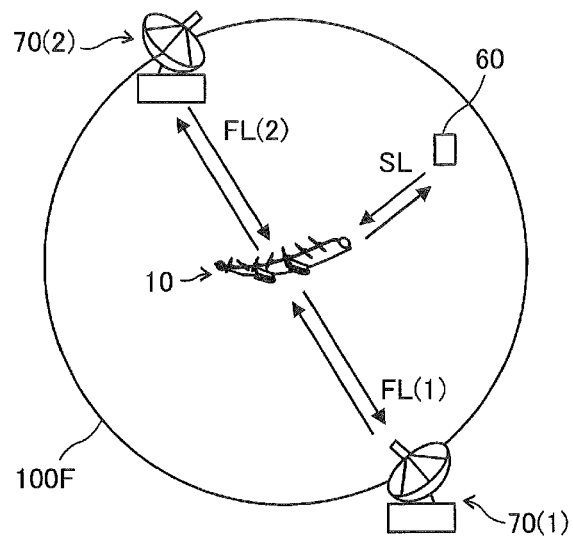
FIG. 4A is an illustration showing another example of an avoidance operation for a propagation-loss increasing part of a feeder link of a HAPS in a communication system according to an embodiment.
Figure 4B:
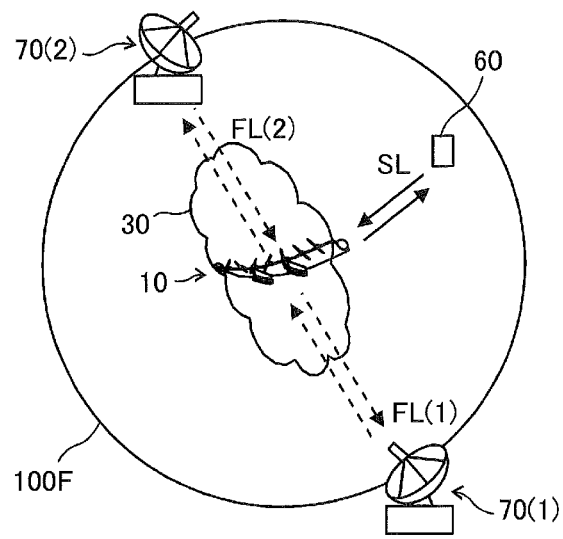
FIG. 4B is an illustration showing another example of an avoidance operation for a propagation-loss increasing part of a feeder link of a HAPS in a communication system according to an embodiment.
Figure 4C:
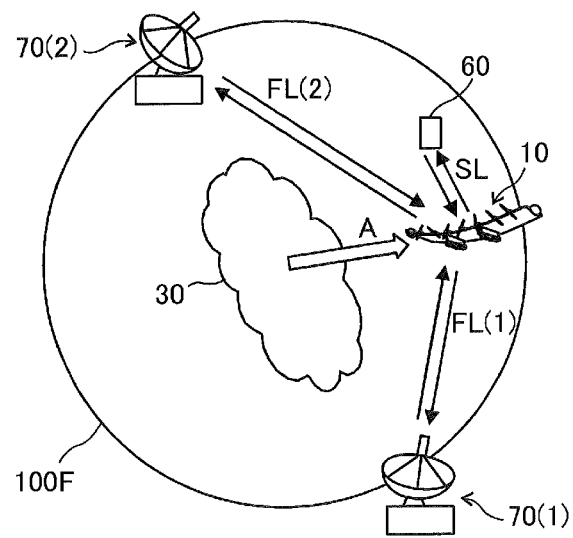
FIG. 4C is an illustration showing another example of an avoidance operation for a propagation-loss increasing part of a feeder link of a HAPS in a communication system according to an embodiment.

FIG. 4A to FIG. 4C are illustrations respectively showing another example of an avoidance operation for propagation-loss increasing part 30 of feeder link of HAPS 10 in a communication system according to an embodiment. It is noted that, in FIG. 4A to FIG. 4C, the description of the parts common to those in the above-described FIG. 1A to FIG. 1C, FIG. 2A to FIG. 2C, and FIG. 3A and FIG. 3B is omitted.

When the propagation-loss increasing part does not occur as shown in FIG. 4A, similar to FIG. 3A described above, the HAPS 10 can perform a radio communication of the plural feeder links FL(1) and FL(2) with each of the plural GW stations 70(1) and 70(2) fixedly disposed at positions different from each other on the ground or on the sea.

When the propagation-loss increasing part 30 such as local rainfall (guerrilla rainstorm), snowfall, storm and sandstorm occurs so as to cover the entire HAPS 10 as shown in FIG. 4B, the communication quality may deteriorate due to the increase of the radio-signal attenuation amount in each of the radio propagation paths of the feeder links FL(1) and FL(2) between the HAPS 10 and the plural GW stations 70(1) and 70(2), the communication quality of the service link between the terminal apparatus 60 in the three-dimensional cell and the HAPS 10 may deteriorate.

Therefore, as shown in FIG. 4C, when the propagation-loss increasing part 30 that covers the entire HAPS 10 is generated, a "dynamic site diversity", in which the HAPS 10 is moved in the direction of arrow A in the figure, is performed. As a result, it is possible to suppress or avoid the deterioration of communication quality due to the increase of radio signal attenuation in the propagation-loss increasing part 30.

It is noted that, in the examples of FIG. 4A to FIG. 4C, when the occurrence of the propagation-loss increasing part 30 across the radio propagation paths of the plural feeder links FL(1) and FL(2) is predicted, the HAPS 10 may be moved in advance to a predetermined target position where the plural feeder links FL(1) and FL(2) are not affected by the propagation-loss increasing part 30 as indicated with the arrow A in the figure, and the deterioration of the communication quality due to the propagation-loss increasing part 30 may be prevented.

Figure 5:
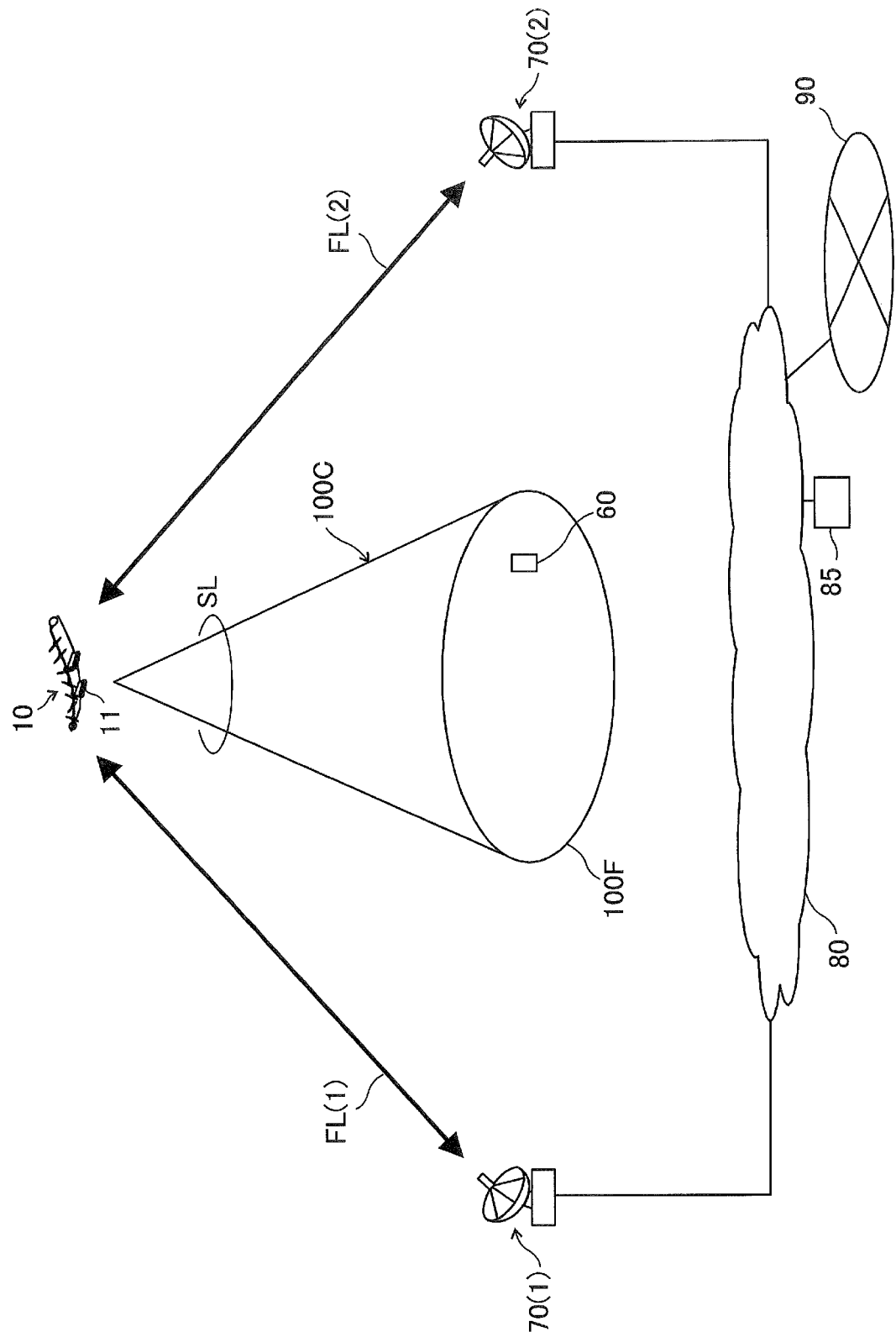
FIG. 5 is an illustration showing an example of an overall configuration of a communication system according to an embodiment.

FIG. 5 is an illustration showing an example of an overall configuration of a communication system having a multi-feeder link configuration according to an embodiment. The communication system according to the present embodiment is suitable for realizing a three-dimensional network of the fifth generation and the later next-generation mobile communication, which supports simultaneous connection to the plural terminal apparatuses and low delay.

Each of the plural GW stations 70(1) and 70(2) is connected to a core network 80 of a mobile communication network via a predetermined interface. Each of the GW stations 70(1) and 70(2) has at least a function of a base station (for example, eNodeB of the LTE or gNodeB of the next-generation such as 5G) of the mobile communication system, and also has a function of a master repeater for a relay communication station (slave repeater) 11 of the HAPS 10. It is noted that, when the relay communication station 11 of the HAPS 10 has the function of the base station of the mobile communication system (for example, eNodeB of the LTE or gNodeB of the next-generation such as the 5G), the GW stations 70(1) and 70(2) may function as relay stations of the backbone line.

The HAPS 10 forms a three-dimensional cell 100C, for example, on the ground (or on the water such as the sea or lake), and a footprint 100F of the cell 100C becomes a service area on the ground (or on the water such as the sea or lake). The number of cells formed by the HAPS 10 may be 2 or more. Further, the cell 100C may be further configured with plural sector cells.

The HAPS 10 may autonomously control the floating movement (flight) of the HAPS itself and the process in the relay communication station 11 by executing a control program by a control section that is configured with a computer or the like incorporated therein. For example, each of the HAPSs 10 may acquire current position information on the HAPS itself (for example, GPS position information), position control information stored in advance (for example, flight schedule information), position information on another HAPS located in the vicinity and the like, and may autonomously control the floating movement (flight) and the process in the relay communication station 11 based on these pieces of information.

The floating movement (flight) of the HAPS 10 and the process in the relay communication station 11 may be controlled by a central control server 85 as a remote control apparatus provided in a communication center or the like, which is connected to the core network 80 of the mobile communication network. The central control server 85 can be configured by, for example, a computer apparatus such as a PC or a server. In this case, the HAPS 10 is provided with a control communication section (for example, a mobile communication module) for receiving control information from the central control server 85 and transmitting various kinds of information such as monitoring information to a predetermined transmission destination such as the central control server 85. The control communication section may be assigned terminal identification information (for example, IP address, telephone number, etc.) so as to communicate with the central control server 85. The MAC address of the communication interface may be used to identify the control communication section of the HAPS 10.

The information received by the HAPS 10 may include, in addition to the control information, the weather information on the area including the radio propagation path of the feeder link of the HAPS 10, which is provided from the weather-information providing organization such as the Japan Meteorological Agency or a private company. The weather information may include information on local occurrence conditions (occurrence time, occurrence location) of a rainfall (guerrilla rainstorm), snowfall, storm, sandstorm and the like.

Transmission and reception of control information and monitoring information between the HAPS 10 and the central control server 85 can be performed, for example, through a communication line of the LTE or the next-generation such as the 5G via the core network 80 of the mobile communication network and the GW station 70. Further, the transmission and reception of control information and monitoring information may be performed using a satellite line for mobile communication via an artificial satellite, or may be performed using a satellite line via the Internet 90 and the artificial satellite.

The monitoring information transmitted from the HAPS 10 may include at least one piece of information on the floating movement (flight) of HAPS 10 itself or its surroundings and the process at the relay communication station 11, the monitoring information including a reception level measured by the HAPS 10 for a reception power of the feeder link between the HAPS 10 and the GW station 70, and information on the status of HAPS 10 and information on observation data acquired by various kinds of sensors, etc. Further, the monitoring information may include at least one piece of information on current position and attitude information, flight route information (flight schedule information, flight-route history information), velocity relative to the air, velocity relative to the ground and propulsion direction of the HAPS 10, wind velocity and wind direction of the airflow around the HAPS 10, and atmospheric pressure and temperature around the HAPS 10. The control information may include information on target flight route of the HAPS 10.

The HAPS 10 and the central control server 85 may acquire maintenance schedule information on the GW station 70, reception level monitor information on the feeder link with the GW station 70 that is measured by the HAPS 10, flight path information on the HAPS 10, current position information and attitude information on the HAPS 10, in addition to the weather forecast information on the area including the radio propagation path of the feeder link described above. These pieces of information may be acquired, for example, from a server of the core network (mobile communication network) 80 or a server of the Internet 90 that manages each piece of information. Further, the central control server 85 may acquire the maintenance schedule information on the GW station 70 from the GW station 70 via the core network 80 of the mobile communication network by a predetermined interface (for example, the S1 interface of the LTE), or may acquire the information from a management server that manages the GW station 70.

Duplex methods of uplink and downlink for radio communication between the relay communication station 11 of the HAPS 10 and the terminal apparatus 60 are not limited to specific methods, and may be, for example, a time division duplex method (Time Division Duplex: TDD) or a frequency division duplex method (Frequency Division Duplex: FDD). An access method for radio communication with the relay communication station 11 and the terminal apparatus 60 is not limited to the specific method, but may be, for example, FDMA (Frequency Division Multiple Access) method, TDMA (Time Division Multiple Access) method, CDMA (Code Division Multiple Access) method, or OFDMA (Orthogonal Frequency Division Multiple Access). In the foregoing radio communication, a MIMO (Multi-Input and Multi-Output) technology may be used, which has functions of diversity/coding, transmission beam forming, spatial division multiplexing (SDM: Spatial Division Multiplexing), etc., and in which a transmission capacity per unit frequency can be increased by simultaneously using plural antennas for both of transmission and reception. The MIMO technology may be an SU-MIMO (Single-User MIMO) technology in which one base station transmits plural signals to one terminal apparatus at the same time/same frequency, and may be an MU-MIMO (Multi-User MIMO) technology in which one base station transmits signals to plural different communication terminal apparatuses at the same time/same frequency.

Figure 6:
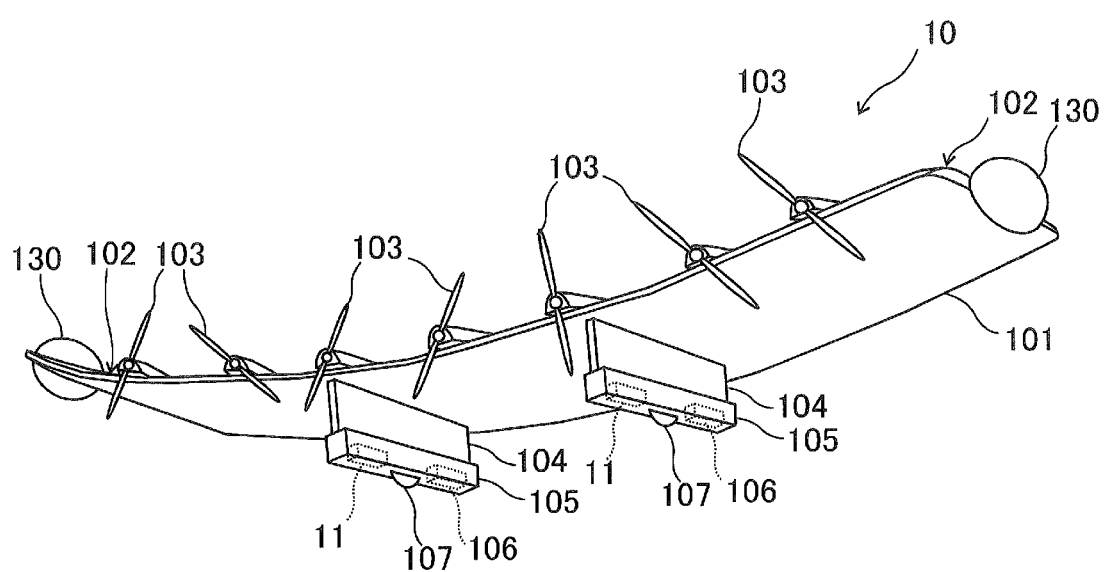
FIG. 6 is a perspective view showing an example of a HAPS that can be used in a communication system according to an embodiment.

FIG. 6 is a perspective view showing an example of HAPS 10 that can be used in a communication system according to an embodiment.

The HAPS 10 in FIG. 6 is a solar-plane type HAPS, and includes a main wing section 101 with both end sides in the longitudinal direction along the upper side, and plural motor-driven propellers 103 as propulsion apparatuses of bus-motive power system provided at one end edge portion of the main wing section 101 in the short direction. On an upper surface of the main wing section 101, a solar photovoltaic panel (hereinafter, referred to as "solar panel") 102 as a photovoltaic-power generation section having a solar photovoltaic function is provided. Further, pods 105 as a plurality of apparatus accommodating sections for accommodating the mission equipment are connected to the two positions in the longitudinal direction of the lower surface of the main wing section 101 via a plate-like connection section 104. Inside each pod 105, a relay communication station 11 as a mission equipment and a battery 106 are accommodated. On a lower surface side of each pod 105, wheels 107 used on departure and arrival are provided. The electric power generated by the solar panel 102 is stored in the battery 106, the motor of the propeller 103 is rotationally driven by the electric power supplied from the battery 106, and the radio relay process by the relay communication station 11 is executed.

The solar-plane type HAPS 10 can float with lift force by, for example, performing a circular turning flight based on a predetermined target flight route, performing a flight along a figure of "D" or performing a flight along a figure of "8", and can float to stay in a predetermined range in the horizontal direction at a predetermined altitude. It is noted that, the solar-plane type HAPS 10 can also fly like a glider when the propeller 103 is not rotationally driven. For example, the solar-plane type HAPS 10 can rise to a high position when electric power of the battery 106 is surplus by power generation of the solar panel 102 such as in daytime, and can fly like a glider by stopping the power supply from the battery 106 to the motor when the solar panel 102 cannot generate power such as at night.

The HAPS 10 includes a three-dimensional directional optical antenna apparatus 130 as a communication section used for communication with another HAPS or artificial satellites. It is noted that, although the optical antenna apparatuses 130 are arranged at both ends in the longitudinal direction of the main wing portion 101 in the example of FIG. 6, the optical antenna apparatuses 130 may be arranged at other positions of the HAPS 10. It is noted that, the communication section used for optical communication with other HAPS or artificial satellites is not limited to the one that performs such optical communication, but may be radio communication by another method such as radio communication by radio waves such as microwaves.

Figure 7:
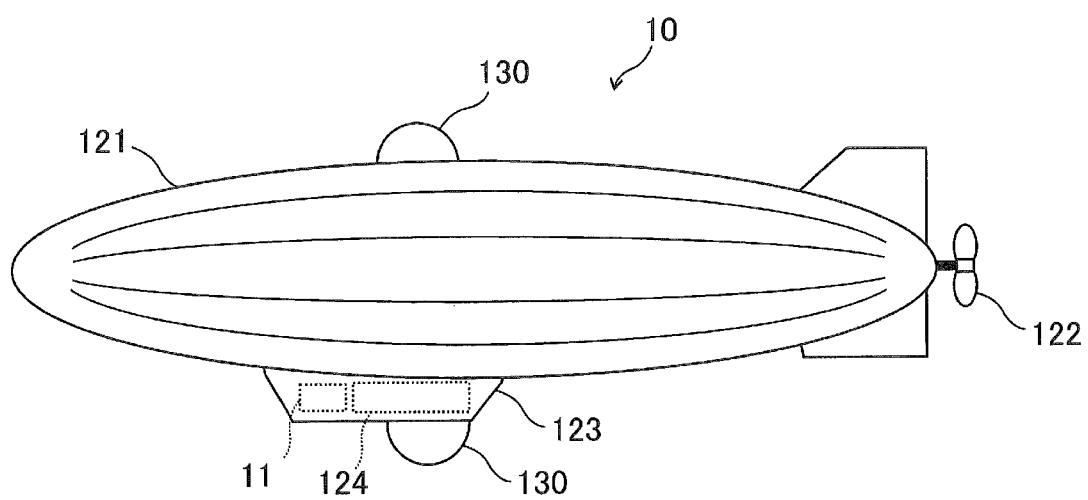
FIG. 7 is a perspective view showing another example of a HAPS that can be used in a communication system according to an embodiment.

FIG. 7 is a perspective view showing another example of HAPS 10 that can be used in a communication system according to an embodiment.

The HAPS 10 in FIG. 7 is an unmanned-airship type HAPS, and can mount a large capacity battery since the payload is large. The HAPS 10 includes an airship body 111 filled with gas such as helium gas for floating by buoyancy, motor-driven propellers 112 as propulsion apparatuses of bus-motive power system, and an equipment accommodating section 113 in which a mission equipment is accommodated. A relay communication station 11 and a battery 114 are accommodated in the equipment accommodating section 113. The motor of the propeller 112 is rotationally driven by an electric power supplied from the battery 114, and a radio relay process by the relay communication station 11 is executed.

It is noted that, a solar panel having a solar photovoltaic function may be provided on the top surface of the airship body 111, and the electric power generated by the solar panel may be stored in the battery 114.

The unmanned-airship type HAPS 10 also includes a three-dimensional directional optical antenna apparatus 130 as a communication section used for optical communication with another HAPS or artificial satellites. It is noted that, although the optical antenna apparatuses 130 are arranged on the upper surface of the airship main body 111 and the lower surface of the equipment accommodating section 113 in the example of FIG. 7, the optical antenna apparatuses 130 may be arranged at other positions of the HAPS 10. It is noted that, the communication section used for optical communication with other HAPS or artificial satellites is not limited to the one that performs such optical communication, but may be radio communication by another method such as radio communication by radio waves such as microwaves.

Figure 8:
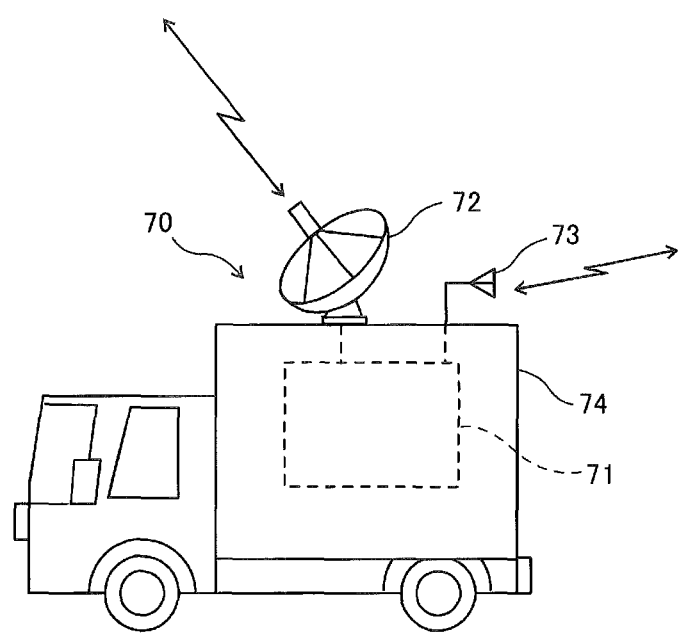
FIG. 8 is a side view showing an example of a movable container-type GW station that can be used in a communication system according to an embodiment.

FIG. 8 is a side view showing an example of a movable container-type GW station 70 that can be used in a communication system according to an embodiment. FIG. 8 shows an example configured as a GW relay vehicle, a GW antenna 72, which is an antenna for feeder link of the GW station 70, is provided on the upper surface of a vehicle body 74 as a mobile object, and a GW station apparatus 71 is provided inside the vehicle body 74. The vehicle body 74 may be, for example, a truck, or a moving body such as another bus or a general automobile.

On the upper surface of the vehicle body 74, in addition to the GW antenna 72 for performing radio communication with the HAPS 10, an antenna 73 for performing a radio communication of the backhaul line with the relay station on the core network 80 side is provided. As a media for the radio communication with the core network 80 side, for example, microwaves can be used, but another radio communication media such as light may be used.

When the GW station 70 composed of the GW relay vehicle moves, by controlling the antenna 73 so as to track the relay station on the core network 80 side, it may be possible to suppress the deterioration of the communication quality of the backhaul line. As the directional beam control method of the antenna 73, various kinds of methods such as a gimbal method, an electric method (360-degree beamforming control method), and an electric method (angle-limited beamforming control method+antenna switching) can be used.

Figure 9:
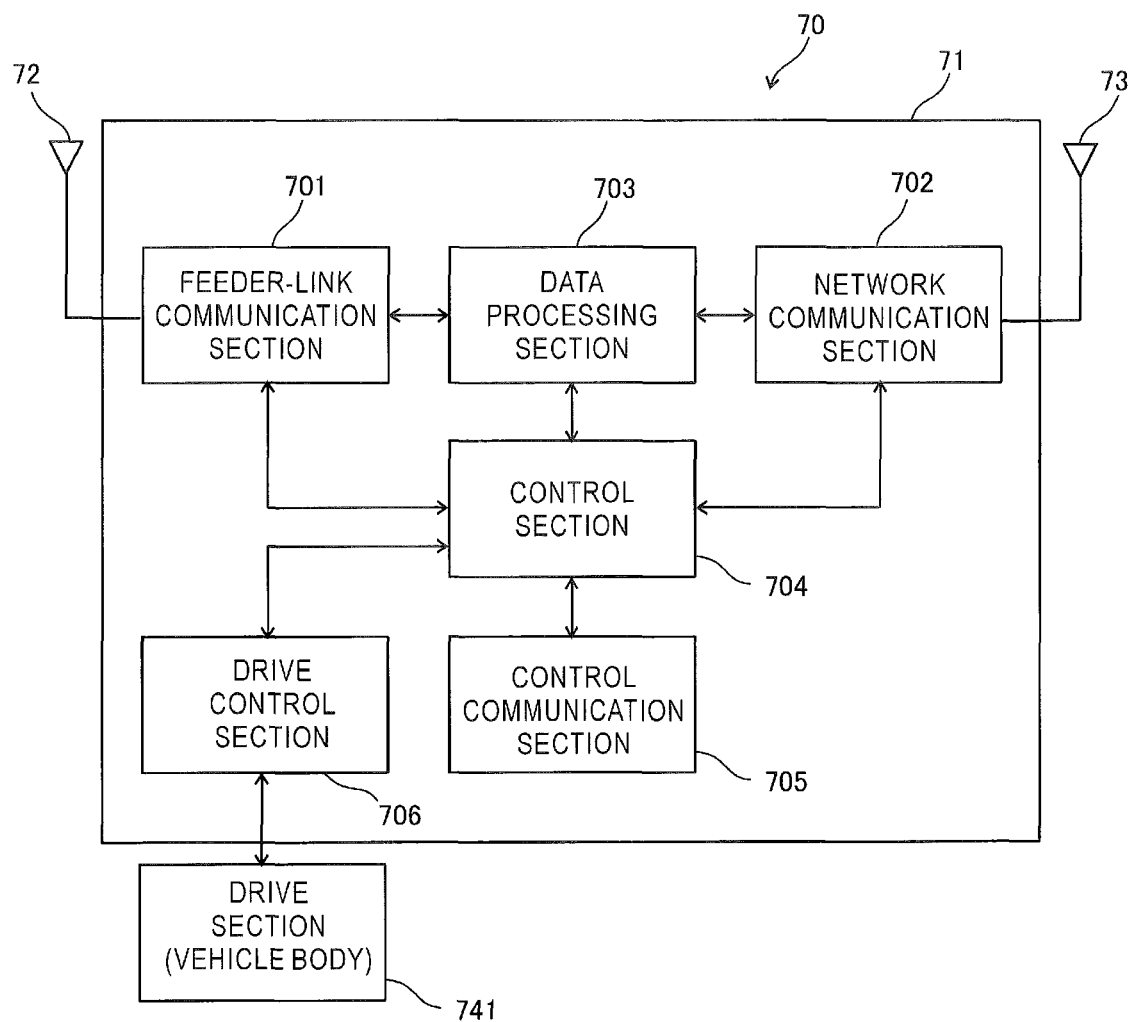
FIG. 9 is a block diagram showing an example of a main configuration of a GW station according to an embodiment.

FIG. 9 is a block diagram showing an example of a main configuration of GW station 70 according to an embodiment. In FIG. 9, the GW station apparatus 71 of the GW station 70 is provided with a feeder-link communication section 701, a network communication section 702, a data processing section 703, a control section 704, a control communication section 705, and a drive control section 706.

The feeder-link communication section 701 transmits and receives radio signals having a feeder link frequency $F_{FL}$ to and from the HAPS 10 via the GW antenna 72. The network communication section 702 transmits and receives radio signals of the backbone having a frequency FB different from the feeder link frequency $F_{FL}$ to and from the relay station on the core network 80 side via the antenna 73. The data processing section 703 performs a baseband process similar to that of the base station (for example, eNodeB or gNodeB).

The control section 704 is configured with a computer or a processor, a memory, or the like, and can control each section by executing a pre-installed control program. For example, the control section 704 may control the directional beam of the GW antenna 72 so as to direct to the direction of the HAPS 10 by mechanically driving the GW antenna 72 or processing the signals in the feeder-link communication section 701 (for example, processing for adjusting the phase and amplitude of each of the transmission signal and the reception signal).

The control section 704 may control the feeder-link communication section 701 so as to measure the radio-signal attenuation amount, the propagation loss or the communication quality of the feeder link at the moving destination to which the GW station 70 has moved.

The feeder-link communication section 701, the network communication section 702 and the data processing section 703 may be configured with, for example, a remote radio apparatus (also referred to as RRH (Remote Radio Head) or RRU (Remote Radio Unit)) and a baseband processing apparatus (BBU (Base Band Unit)) in a general LTE base station. The RRH and BBU may be connected by an optical fiber line and placed apart from each other. Further, the BBUs of the plural GW stations may be aggregated and disposed in one place.

The RRH is provided with, for example, an orthogonal modulation/demodulation section, a transmission section, a reception section, a power amplifier (PA (Power Amplifier)), and a low noise amplifier (LNA (Low Noise Amplifier)). The orthogonal modulation/demodulation section performs an orthogonal modulation/demodulation of the OFDM signal processed by the BBU, and converts it into an analog signal (RF signal). The transmission section converts the frequency of the RF signal generated by the orthogonal modulation/demodulation section into a frequency to be transmitted as a radio wave. The reception section converts the frequency of the high-frequency signal of the received radio wave into a frequency processed by the orthogonal modulation/demodulation section. The power amplifier (PA) power-amplifies the RF signal generated by the transmission section. The low noise amplifier (LNA) amplifies the received weak radio wave and passes it to the reception section.

The BBU is provided with, for example, a base-station control section, a transmission-path interface section, a timing control section and a baseband section, and is connected to the core network 80 of the mobile communication network via a predetermined interface (for example, S1 interface). The base-station control section controls the entire base station and performs call control protocols and control monitoring. The transmission-path interface section is connected to a packet transmission path such as Ethernet (registered trademark) with a core network or the like, and processes a predetermined protocol to send and receive IP packets. The timing control section generates various kinds of clocks to be used inside the base station based on the reference clock extracted from the signal received via the packet transmission path or the GNSS (Global Navigation Satellite System) reception signals from the artificial satellite. The baseband section converts (modulates and demodulates) IP packets sent and received through the transmission-path interface section and OFDM signals (baseband signals) which are radio signals.

The control communication section 705 is configured with, for example, a mobile communication module having a communication function of the LTE or the next-generation (for example, the fifth-generation), a satellite communication function or both of the communication functions, and is assigned terminal identification information (for example, IP address, telephone number, etc.) so as to communicate with the central control server 85. The MAC address of the communication interface may be used to identify the control communication section 705.

The drive control section 706 controls a drive section 741 of the vehicle body 74, on which the GW station apparatus 71 is mounted, based on current position information on the GW station 70, control information received from the central control server 85, and the like, by cooperating with the control section 704. For example, when the local propagation-loss increasing part 30 occurs in the radio propagation path of the feeder link or when the occurrence of the propagation-loss increasing part 30 is predicted, the drive control section 706 controls the drive section 741 of the vehicle body 7 so as to move the GW station 70 to a predetermined target position where the deterioration of communication quality due to the propagation-loss increasing part 30 in the radio propagation path of the feeder link can be suppressed or avoided. It is noted that, the movement of the GW station 70 to the predetermined target position may be performed by steering or driving the vehicle body 74 by an operator (person), instead of autonomous drive of the vehicle body 74.

When the GW station 70 connects to the plural HAPSs 10 and performs a radio communication of the feeder link, the drive control section 706 may perform a drive control so that the GW station 70 moves to an optimum position for the plural connected HAPSs 10. Further, when another HAPS of a communication carrier (operation and management entity) different from the connected HAPS 10 is located around the connected HAPS 10 performing a radio communication of the feeder link with the GW station 70, the drive control section 706 may perform a drive control so that the GW station 70 moves to an optimum position for both of the connected HAPS 10 and other HAPS.

The drive control section 706 may acquire weather information that affects the occurrence of the propagation-loss increasing part 30, and may perform a drive control so that the GW station 70 moves to the predetermined target position based on the weather information.

The drive control section 706 may detect or predict a temporal fluctuation or spatial fluctuation in weather (for example, rainfall intensity) that affects the occurrence of the propagation-loss increasing part 30, and may perform a drive control so that the GW station 70 moves to the predetermined target position based on a result of the detection or the prediction of the temporal fluctuation or spatial fluctuation in the weather.

The drive control section 706 may also measure the propagation loss or the radio-signal attenuation amount in the radio propagation path of the feeder link, and may perform a drive control so that the GW station 70 moves to the predetermined target position based on a result of the measurement.

Figure 10:
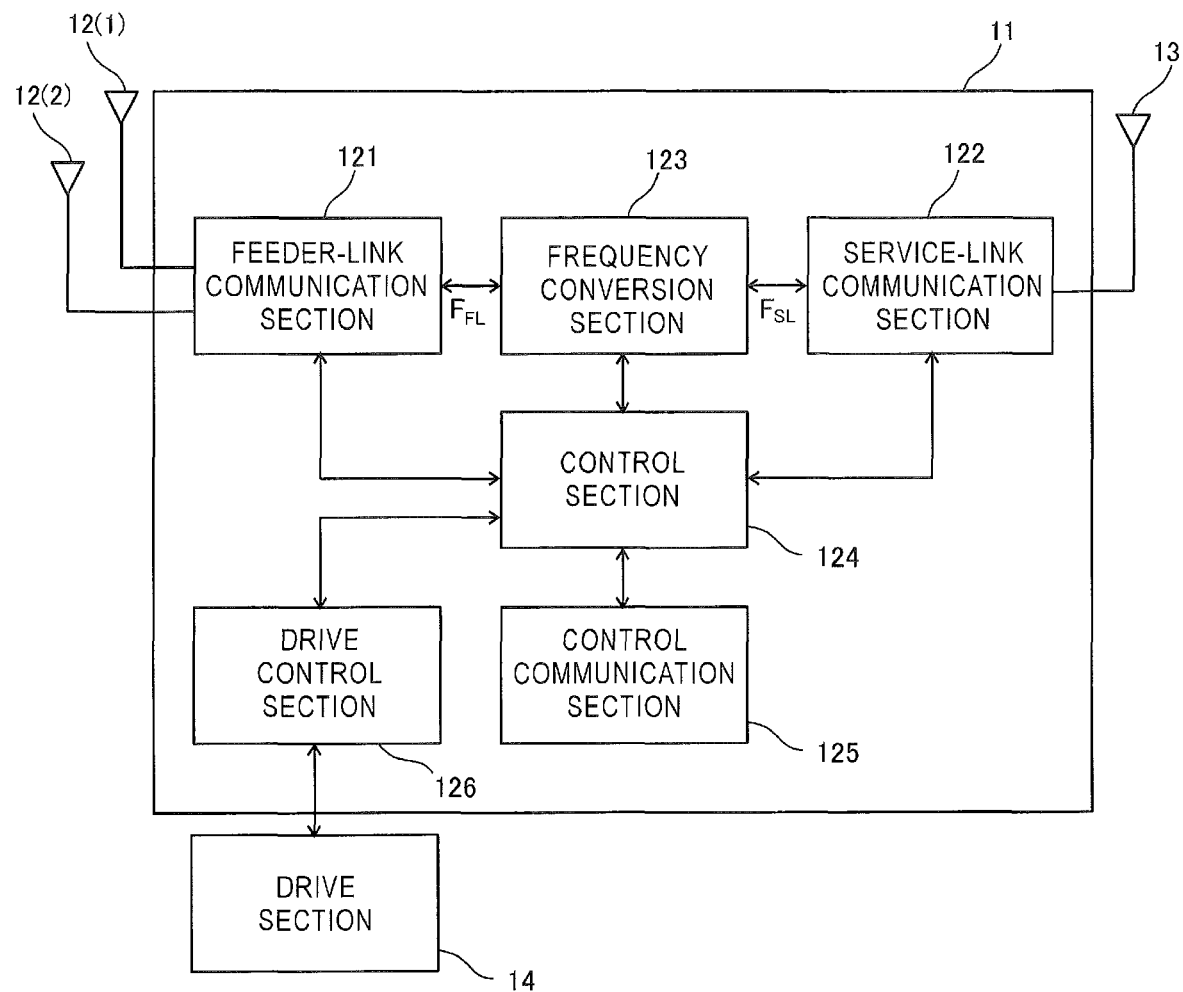
FIG. 10 is a block diagram showing an example of a main configuration of a relay communication station of a HAPS according to an embodiment.

FIG. 10 is a block diagram showing a configuration example of relay communication station 11 of HAPS 10 according to an embodiment. The relay communication station 11 in FIG. 10 is an example of a repeater-type relay communication station (slave repeater). The relay communication station 11 is provided with a feeder-link communication section 121, a service-link communication section 122, a frequency conversion section 123, a control section 124 that controls each section, a control communication section 125, and a drive control section 126.

The feeder-link communication section 121 transmits and receives radio signals of feeder link frequency $F_{FL}$ to and from the GW station 70 via FL antennas 12(1) and 12(2). The number (N) of FL antennas 12 and the number (N) of GW stations 70 are the same, respectively (two in the illustrated example), and the plural FL antennas 12(1) and 12(2) are provided so as to have a one-to-one correspondence with the GW stations 70(1) and 70(2).

The service-link communication section 122 transmits and receives radio signals of service link frequency $F_{SL}$ to and from the terminal apparatus 60 via a SL antenna 13. The SL antenna 13 is provided with a beam former that forms a beam of the service link, and can arbitrarily change a shape of the cell 100C of the service link.

The frequency conversion section 123 performs a frequency conversion between the feeder link frequency $F_{FL}$ and the service link frequency $F_{SL}$ between the feeder-link communication section 121 and the service-link communication section 122. The radio signal relayed by the relay communication station 11 may be transmitted and received using, for example, an OFMDA communication method conforming to the LTE or LTE-Advanced standard.

The control section 124 is configured with a computer or a processor, a memory, or the like, and can control each section by executing a pre-installed program. For example, the control section 124 may control the directional beams of the FL antennas 12(1) and 12(2) so as to direct to the directions of the GW stations 70(1) and 70(2) by mechanically driving the FL antennas 12(1) and 12(2) or processing the signals in the feeder-link communication section 121 (for example, processing for adjusting the phase and amplitude of each of the transmitted signal and the received signal).

The control section 124 may control the position and shape of the footprint 100F on the ground or on the sea of the cell 100C of the service link so as to move within a maintainable range.

After the movement of the HAPS 10 or during the movement of the HAPS 10, the control section 124 may control the directional beam of the service-link communication section 122 so as to maintain the position and shape of the footprint 100F on the ground or on the sea of the service link cell in the position and shape of the footprint before the movement of the HAPS 10.

The control section 124 may control the feeder-link communication section 121 so as to measure the radio-signal attenuation amount or the propagation loss or the communication quality of the feeder link at the moving destination to which the HAPS 10 has moved.

When another HAPS of a different communication operator (management and operation entity) is located around the HAPS 10, the control section 124 may control to instruct a moving destination, which is a predetermined target position where the feeder link is not affected by the propagation-loss increasing part 30, to the other HAPS via, for example, inter-HAPS communication. The position of the moving destination is set, for example, to a position where an interference between the HAPS 10 and the other HAPS is unlikely to occur.

The control communication section 125 is configured with, for example, a mobile communication module having a communication function of the LTE or the next-generation (for example, the fifth-generation), a satellite communication function or both of the communication functions, and is assigned terminal identification information (for example, IP address, telephone number, etc.) so as to communicate with the central control server 85. The MAC address of the communication interface may be used to identify the control communication section 125.

The drive control section 126 controls a drive section 14 (for example, the drive motor of the propeller 103 described above) of the HAPS 10 based on current position information on the HAPS 10, control information received from the central control server 85, flight route information, and the like, by cooperating with the control section 124. For example, when the local propagation-loss increasing part 30 occurs in the radio propagation path of the feeder link or when the occurrence of the propagation-loss increasing part 30 is predicted, the drive control section 126 controls the drive section 14 of the HAPS 10 so as to move the HAPS 10 to a predetermined target position where the deterioration of communication quality due to the propagation-loss increasing part 30 in the radio propagation path of the feeder link can be suppressed or avoided.

The drive control section 126 may acquire weather information (for example, weather forecast information) that affects the occurrence of the propagation-loss increasing part 30, and may perform a drive control so as to move to the predetermined target position based on the weather information.

The drive control section 126 may detect or predict a temporal fluctuation or spatial fluctuation in weather (for example, rainfall intensity) that affects the occurrence of the propagation-loss increasing part 30, and may perform a drive control so as to move to the predetermined target position based on a result of the detection or the prediction of the temporal fluctuation or spatial fluctuation in the weather. Herein, the drive control section 126 may measure the propagation loss or the radio-signal attenuation amount in the radio propagation paths of the plural links, including the feeder link with the GW station 70 and a link with a radio apparatus (for example, FWA) disposed on the ground or on the sea so that it is positioned at a position different from the GW station 70, and may detect or predict the spatial fluctuation in the weather (for example, rainfall intensity) based on a result of the measurement.

The drive control section 126 may measure the propagation loss or the radio-signal attenuation amount in the radio propagation path of the feeder link, and may perform a drive control so as to move to the predetermined target position based on a result of the measurement.

When another HAPS is located around the HAPS 10, the drive control section 126 may perform a drive control so as to move in cooperation with the other HAPS so that the HAPS 10 and the other HAPS are optimally disposed with each other.

The drive control section 126 may autonomously control the floating movement (flight) of the HAPS 10 itself and the process in the relay communication station. For example, the drive control section 126 may acquire current position information on the HAPS 10 itself (for example, GPS position information), position control information stored in advance (for example, flight schedule information), position information on other HAPS located in the vicinity, and the like, and may autonomously control the floating movement (flight) and the process in the relay communication station based on these pieces of information.

Next, it is described of an example of dynamic-site diversity control in the HAPS 10 of the communication system having the aforementioned configuration.

Figure 11:
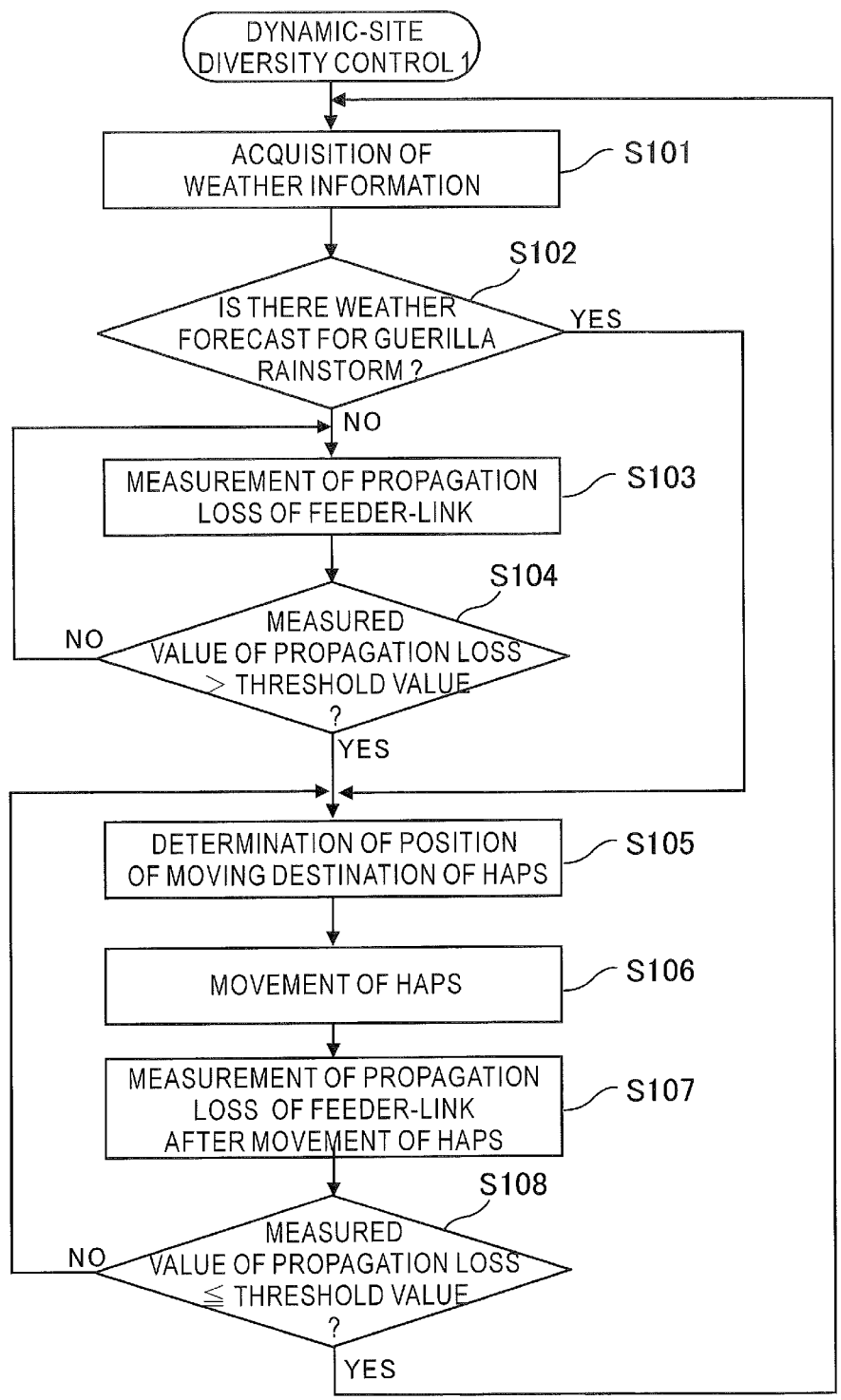
FIG. 11 is a flowchart showing an example of a dynamic-site diversity control in a HAPS according to an embodiment.
Figure 12:
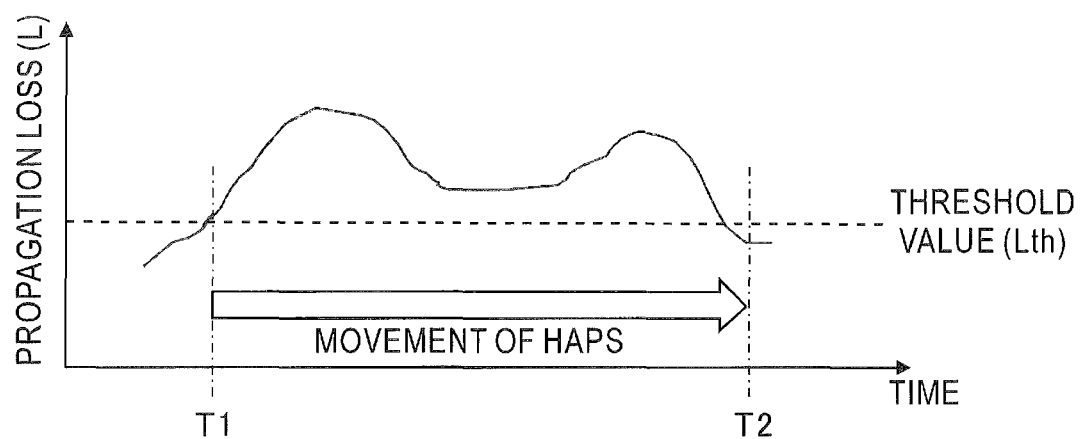
FIG. 12 is a graph showing an example of a temporal fluctuation of a propagation loss in the dynamic-site diversity control in FIG. 11.

FIG. 11 is a flowchart showing an example of dynamic-site diversity control in the HAPS 10 according to an embodiment. FIG. 12 is a graph showing an example of temporal fluctuation of the propagation loss of the feeder link in the dynamic-site diversity control of FIG. 11. It is noted that, in the examples of FIG. 11 and FIG. 12, although the movement of the HAPS 10 is autonomously controlled by the HAPS 10 itself, the movement of the HAPS 10 may be remotely controlled from the central control server 85.

In FIG. 11, the HAPS 10 acquires weather information including a weather forecast (for example, the location and time of occurrence of guerrilla rainstorm) in an area including a radio propagation path of a feeder link with the GW station 70 (S101). The weather information may be acquired from the central control server 85, or may be acquired from a server of a weather-information providing organization such as the Japan Meteorological Agency or a private company. Further, the weather information may be measured and acquired by a rain cloud radar provided in the HAPS 10.

Next, the HAPS 10 determines whether there is a weather forecast for guerrilla rainstorm causing the local propagation-loss increasing part 30 that occurs in the area including the radio propagation path of the feeder link (frequency: $F_{FL}$), based on the foregoing weather information acquired (S102). In case that there is no weather forecast for the guerrilla rainstorm (NO in S102), the HAPS 10 measures the propagation loss L of the radio propagation path of the feeder link in the line of sight (LOS: line of sight) environment of the frequency $F_{FL}$ to and from the GW station 70 on the ground side (or on the sea side) (S103). The propagation loss L [dB] can be calculated by the calculation formula: L=Pt−Pr, for example, using the data of the transmission power Pt [dBm] acquired from the GW station 70 and the measured value of the reception power Pr [dBm] measured by the HAPS 10.

Next, the HAPS 10 compares the measured value Lm of the propagation loss L with a preset threshold value Lth (S104). In case that the measured value Lm of the propagation loss is larger than the threshold value Lth (Lm>Lth) (YES in S104, see T1 in FIG. 12), the HAPS 10 determines a target position of the moving destination of the HAPS 10, at which the deterioration of communication quality due to the propagation-loss increasing part of the guerrilla rainstorm can be suppressed or avoided (S105). In case that there is the weather forecast for guerrilla rainstorm in the aforementioned S102 (YES in S102), the target position of the moving destination of the HAPS 10 is determined in the same manner (S105). Herein, in case that the propagation loss of the feeder link is large due to the influence of the guerrilla rainstorm in the entire range of the candidate positions of the moving destination of the HAPS 10, the position where the influence of the guerrilla rainstorm is the least (the position where the increase amount in propagation loss is the smallest) in the range may be determined as the target position.

On the other hand, in case that the measured value Lm of the propagation loss is equal to or less than the threshold value Lth (Lm≤Lth) (NO in S104), the HAPS 10 repeats the measurement of the propagation loss, the comparison with the threshold value and the determination (S103, S104).

Next, the HAPS 10 moves to the target position determined above and controls the flight of the HAPS 10 so as to stay at the target position (S106). After moving to the target position and reaching there, the HAPS 10 measures the propagation loss L of the radio propagation path of the feeder link again (S107), and when it is confirmed that the propagation-loss measured value Lm is equal to or less than the threshold value Lth (YES in S108, see T2 in FIG. 12), the process returns to the foregoing S101. On the other hand, in case that the propagation-loss measured value Lm is more than the threshold value Lth (NO in S108), the foregoing steps S105 to S108 are repeatedly performed.

Figure 13:
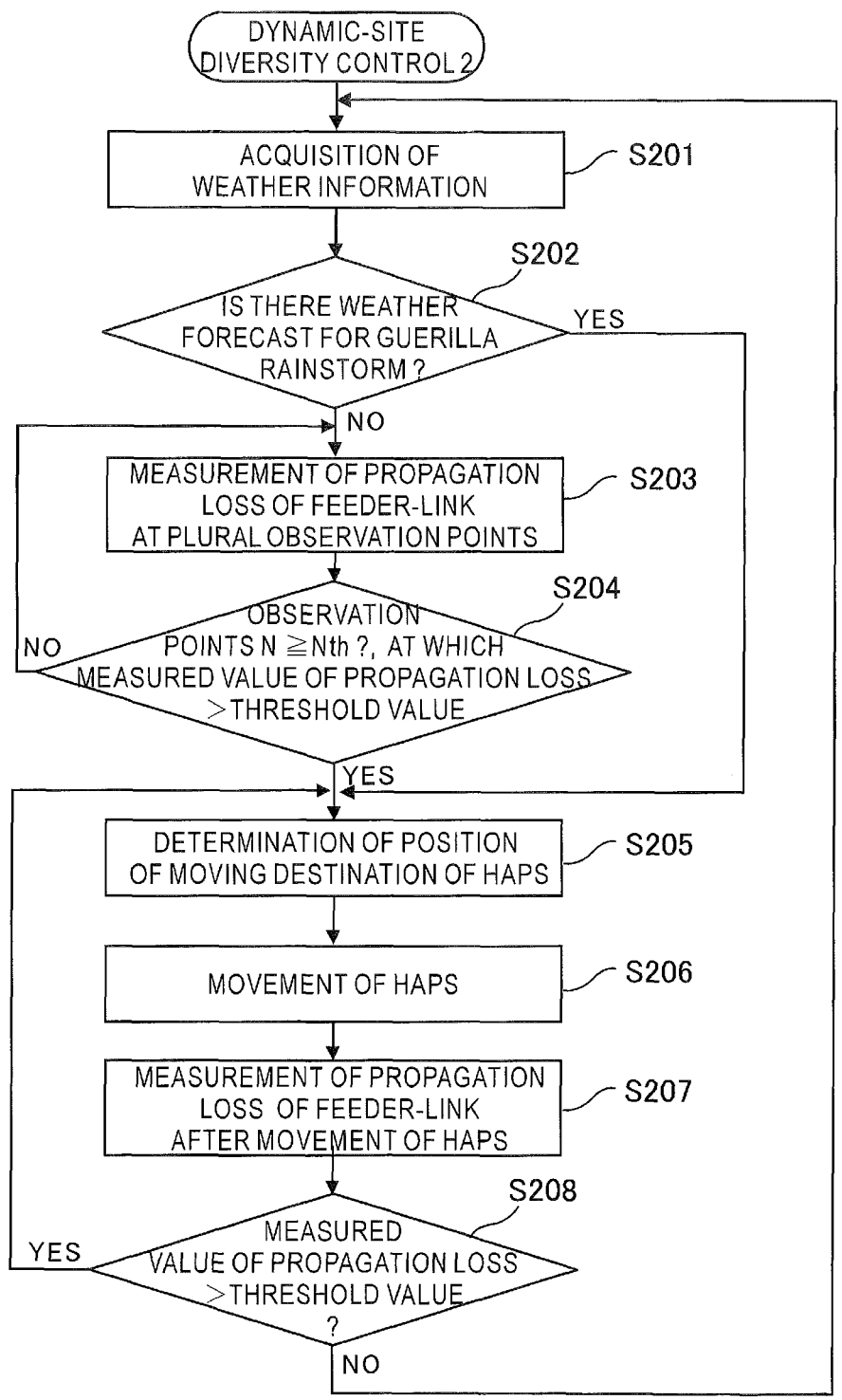
FIG. 13 is a flowchart showing another example of a dynamic-site diversity control of a feeder link in a HAPS according to an embodiment.
Figure 14:
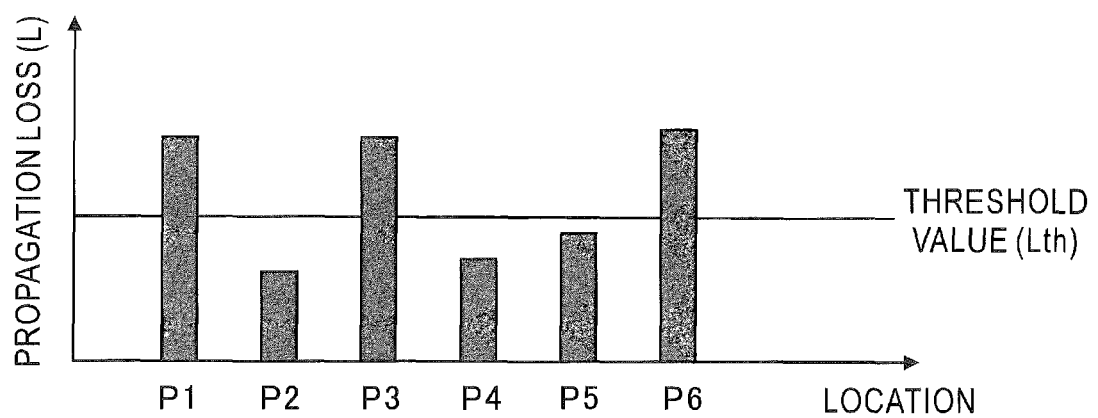
FIG. 14 is a graph showing an example of a spatial fluctuation of a propagation loss of a feeder link in the dynamic-site diversity control in FIG. 13.

FIG. 13 is a flowchart showing another example of dynamic-site diversity control of the feeder link in the HAPS 10 according to an embodiment. FIG. 14 is a graph showing an example of spatial fluctuation of the propagation loss of the feeder link in the dynamic-site diversity control in FIG. 13. It is noted that, since the S201, S202, and S205 to S208 in FIG. 13 are the same as the aforementioned S101, S102, and S105 to S108 in FIG. 11, the description of these steps is omitted. Further, in the examples of FIG. 13 and FIG. 14, although the movement of the HAPS 10 is autonomously controlled by the HAPS 10 itself, the movement of the HAPS 10 may be remotely controlled from the central control server 85.

In FIG. 13, when there is no weather forecast for guerrilla rainstorm (NO in S202), the HAPS 10 measures the propagation loss L of the radio propagation path of the plural links in the line-of-sight (LOS) environment of the frequency $F_{FL}$ to and from plural observation points including the GW station 70 on the ground side (or on the sea side) and another radio apparatus (for example, FWA) (S203).

Next, the HAPS 10 compares the number N of observation points at which the measured value Lm of the propagation-loss is larger than the preset threshold value Lth (Lm>Lth) among the plural observation points, with preset threshold value Nth (S204). Herein, in case that the number N of observation points, at which the measured value Lm of the propagation loss is larger than the threshold value Lth, is equal to or greater than the threshold value Nth (three observation points in the example of FIG. 14) (N≥Nth) (YES in S204), the HAPS 10 determines a target position of the moving destination of the HAPS 10, at which the deterioration of communication quality due to the propagation-loss increasing part of the guerrilla rainstorm can be suppressed or avoided (S205). Herein, in case that the propagation loss of the feeder link is large due to the influence of the guerrilla rainstorm in the entire range of the candidate positions of the moving destination of the HAPS 10, the position where the influence of the guerrilla rainstorm is the least (the position where the increase amount of propagation loss is the smallest) in the range may be determined as the target position.

On the other hand, in case that the number N of observation points, at which the measured value Lm of propagation loss is larger than the threshold value Lth, is smaller than the threshold value Nth (N<Nth) (NO in S204), the HAPS 10 repeats the measurement of the propagation loss at the plural observation points, the comparison with the threshold value and the determination (S203, S204).

It is noted that, in the examples of FIG. 11 to FIG. 14, although the propagation loss in the radio communication of the forward link from the GW station 70, etc. on the ground side (or on the sea side) to the HAPS 10 is measured, the propagation loss in the radio communication of the reverse link from the HAPS 10 to the GW station 70, etc. on the ground side (or on the sea side) may be measured. Further, the dynamic-site diversity control in FIG. 11 and FIG. 12 and the dynamic-site diversity control in FIG. 13 and FIG. 14 may be combined and performed.

Figure 15:
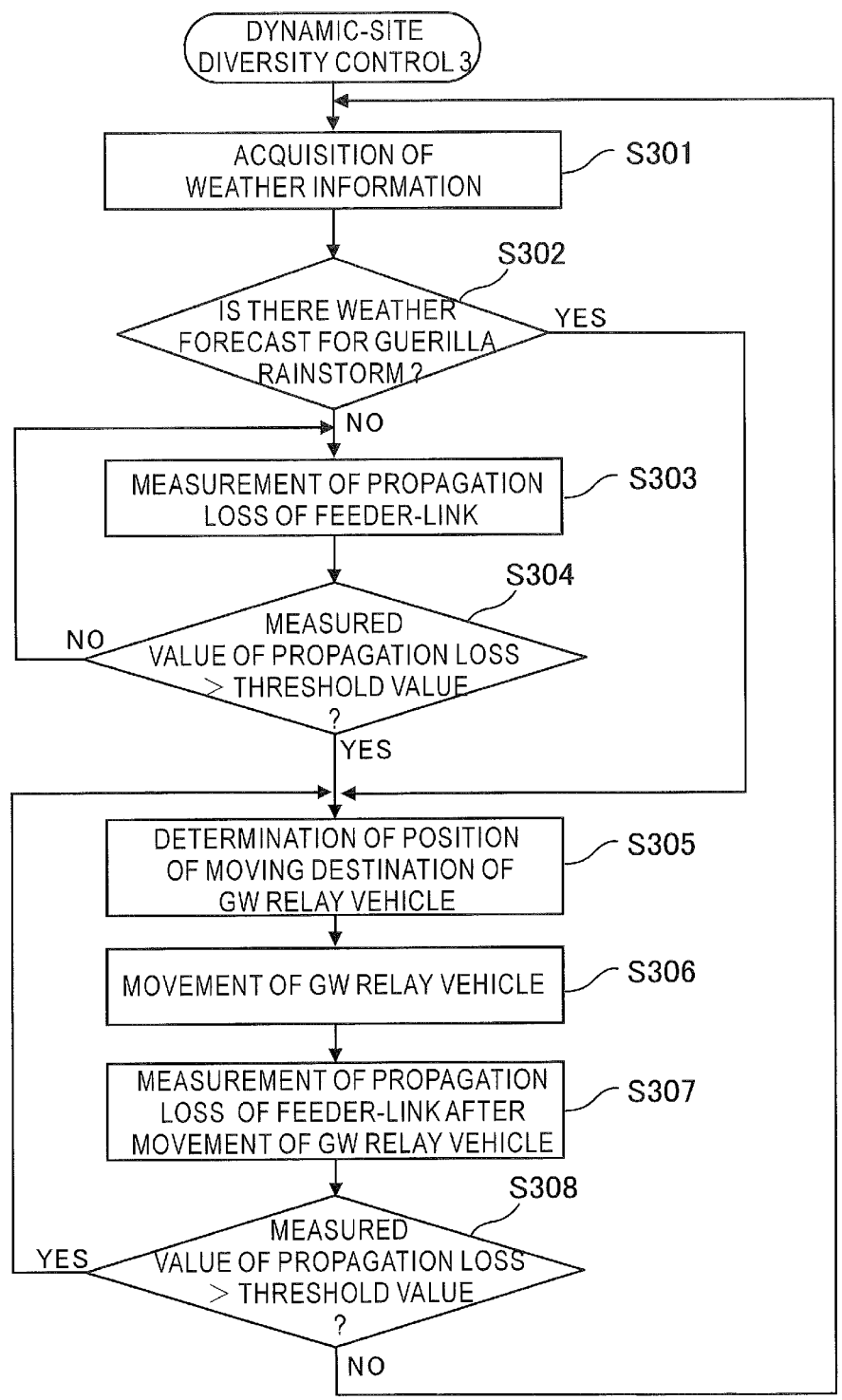
FIG. 15 is a flowchart showing yet another example of a dynamic-site diversity control in a HAPS according to an embodiment.

FIG. 15 is a flowchart showing yet another example of dynamic-site diversity control in the GW station 70 according to an embodiment. It is noted that, in the example of FIG. 15, although the GW station 70 itself autonomously controls the movement of the GW station 70 configured as a GW relay vehicle, the movement of the GW station 70 may be remotely controlled from the central control server 85.

In FIG. 15, the GW station (GW relay vehicle) 70 acquires weather information including a weather forecast (for example, the location and time of occurrence of guerrilla rainstorm) in an area including a radio propagation path of the feeder link with the HAPS 10 (S301). The weather information may be acquired from the central control server 85, or may be acquired from a server of a weather-information providing organization such as the Japan Meteorological Agency or a private company. Further, the weather information may be measured and acquired by a rain cloud radar provided in the GW station 70.

Next, the GW station 70 determines whether there is a weather forecast for guerrilla rainstorm that causes the local propagation-loss increasing part 30 generated in the area including the radio propagation path of the feeder link (frequency: $F_{FL}$), based on the weather information acquired above (S302). In case that there is no weather forecast for the guerrilla rainstorm (NO in S302), the GW station 70 measures the propagation loss L of the radio propagation path of the feeder link in the line-of-sight (LOS) environment of the frequency $F_{FL}$ with the HAPS 10 (S303). The propagation loss L [dB] can be calculated by the calculation formula: L=Pt−Pr, for example, using the data of the transmission power Pt [dBm] acquired from the HAPS 10 and the measured value of the reception power Pr [dBm] measured by the GW station 70.

Next, the GW station 70 compares the measured value Lm of the propagation loss L with a preset threshold value Lth (S304). In case that the measured value Lm of the propagation loss is larger than the threshold value Lth (Lm>Lth) (YES in S304), the GW station 70 determines a target position of the moving destination of the GW station 70, at which the deterioration of communication quality due to the propagation-loss increasing part of the guerrilla rainstorm can be suppressed or avoided (S305). In case that there is the weather forecast for guerrilla rainstorm in the aforementioned S302 (YES in S302), the target position of the moving destination of the GW station 70 is determined in the same manner (S305). Herein, in case that the propagation loss of the feeder link is large due to the influence of the guerrilla rainstorm in the entire range of the candidate positions of the moving destination of the GW station 70, the position where the influence of the guerrilla rainstorm is the least (the position where the increase amount in propagation loss is the smallest) in the range may be determined as the target position.

On the other hand, in case that the measured value Lm of the propagation loss is equal to or less than the threshold value Lth (Lm≤Lth) (NO in S304), the GW station 70 repeats the measurement of the propagation loss, the comparison with the threshold value and the determination (S303, S304).

Next, the GW station 70 controls to move to the above-determined target position (S306). After moving to the target position and reaching there, the GW station 70 measures the propagation loss L of the radio propagation path of the feeder link again (S307), and when it is confirmed that the propagation-loss measured value Lm is equal to or less than the threshold value Lth (YES in S308), the process returns to the foregoing S301. On the other hand, in case that the propagation-loss measured value Lm is more than the threshold value Lth (NO in S308), the foregoing steps S305 to S308 are repeatedly performed.

It is noted that, in the example of FIG. 15, although the propagation loss in the radio communication of the reverse link from the HAPS 10 to the GW station 70 on the ground side (or on the sea side) is measured, the propagation loss in the radio communication of the forward link from the GW station 70 on the ground side (or on the sea side) to the HAPS 10 may be measured.

Further, in the examples of FIG. 11 to FIG. 15, when the transmission power is constant, the measured value of the reception power instead of the measured value of the propagation loss may be compared with the threshold value to determine whether the HAPS 10 or the GW station 70 is to be moved.

Next, it is described of an example of a network configuration of GW station 70 and its surroundings in a communication system of an embodiment.

Figure 16:
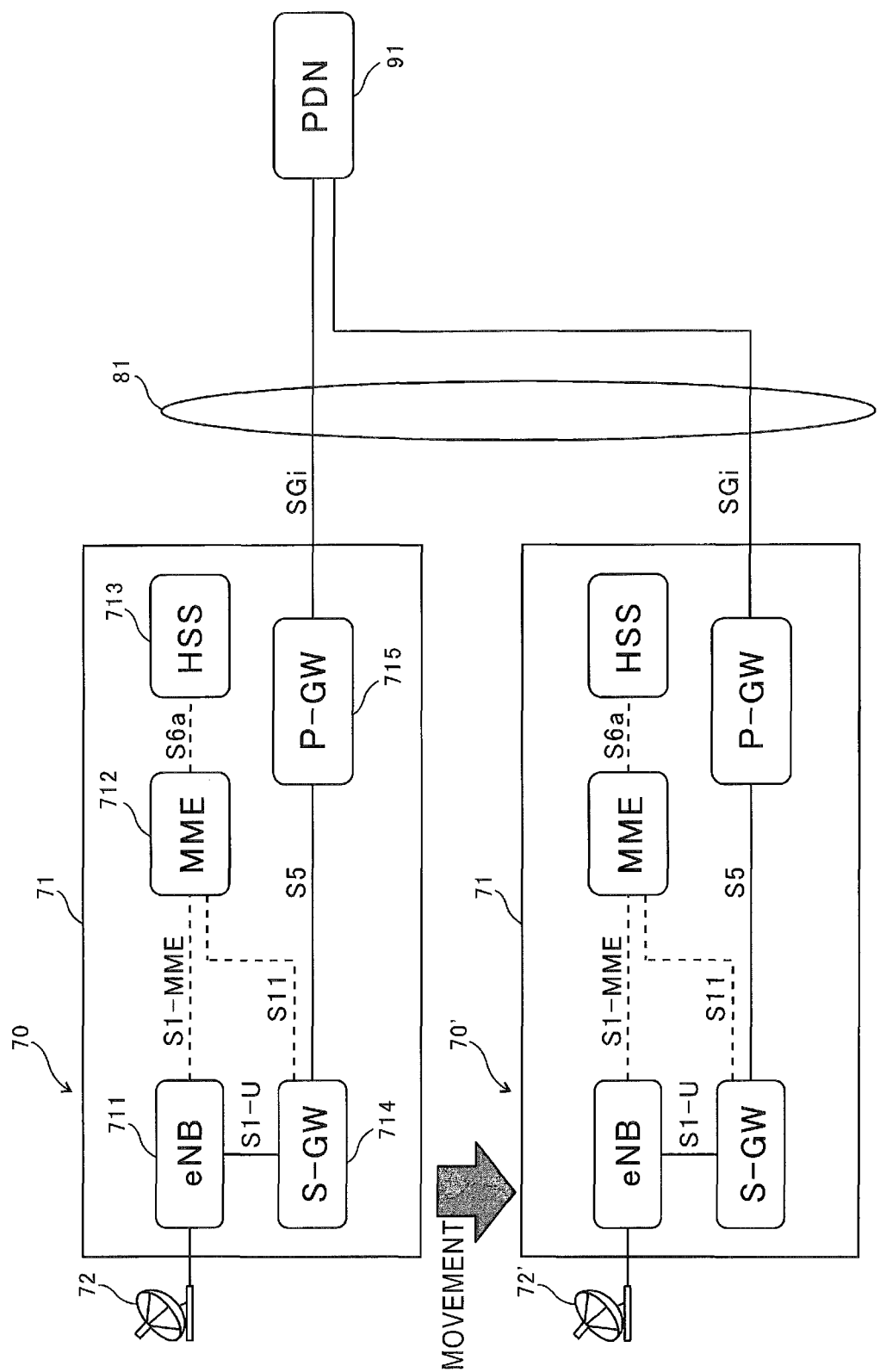
FIG. 16 is an illustration showing an example of a network configuration of a GW station and its surroundings in a communication system according to an embodiment.

FIG. 16 is an illustration showing an example of a network configuration of the GW station 70 and its surroundings in a communication system according to an embodiment. FIG. 16 is an example of a communication system including a single GW station 70 of a movable container type. In FIG. 16, the GW station 70 (GW station apparatus 71 and GW antenna 72) shows the status before moving, and the GW station 70' (GW station apparatus 71' and the GW antenna 72') shows the status after moving.

In FIG. 16, the GW station apparatus 71 is provided with an eNB (eNodeB) 711, an MME (Mobility Management Entity) 712, an HSS (Home Subscriber Server) 713, an S-GW (Serving Gateway) 714, and a P-GW (PDN Gateway) 715. The eNB 711 has a function of a base station apparatus of the LTE mobile communication system (for example, the functions of the above-mentioned RRH and BBU), and is connected to the GW antenna 72.

The MME 712 is a logical node that accommodates the eNB 711 and performs a mobility control such as a location registration, paging and handover, and an establishment and deletion of a bearer. Further, the MME 712 performs a user authentication based on authentication information notified from the HSS 713, and performs an encryption of signal to and from the terminal apparatus (mobile station) 60. The HSS 713 is a subscriber information database in the mobile communication network, and manages authentication information and service area information.

The S-GW 714 functions as a gateway that handles a user-plane (User-plane) of user data. The P-GW 715 is a connection point for connecting to a PDN (Packet Data Network) 91, which is an external network such as the Internet, via a central site of the core network, and is a gateway that performs an assignment of IP addresses and a transfer of packets to the S-GW 714. Further, the P-GW 715 has an interface function to the Internet, a service server of a mobile communication carrier (communication carrier), a voice call system, and the like.

In the figure, the transmission path of solid line, which connects between the nodes, is an interface of a user-plane (User-plane), and the transmission path of broken line is an interface of a control-plane (Control-plane). Further, the GW station apparatus 71 and the central site of the core network on the PDN 91 side are connected via a radio relay path (for example, a microwave relay path) 81.

Figure 17:
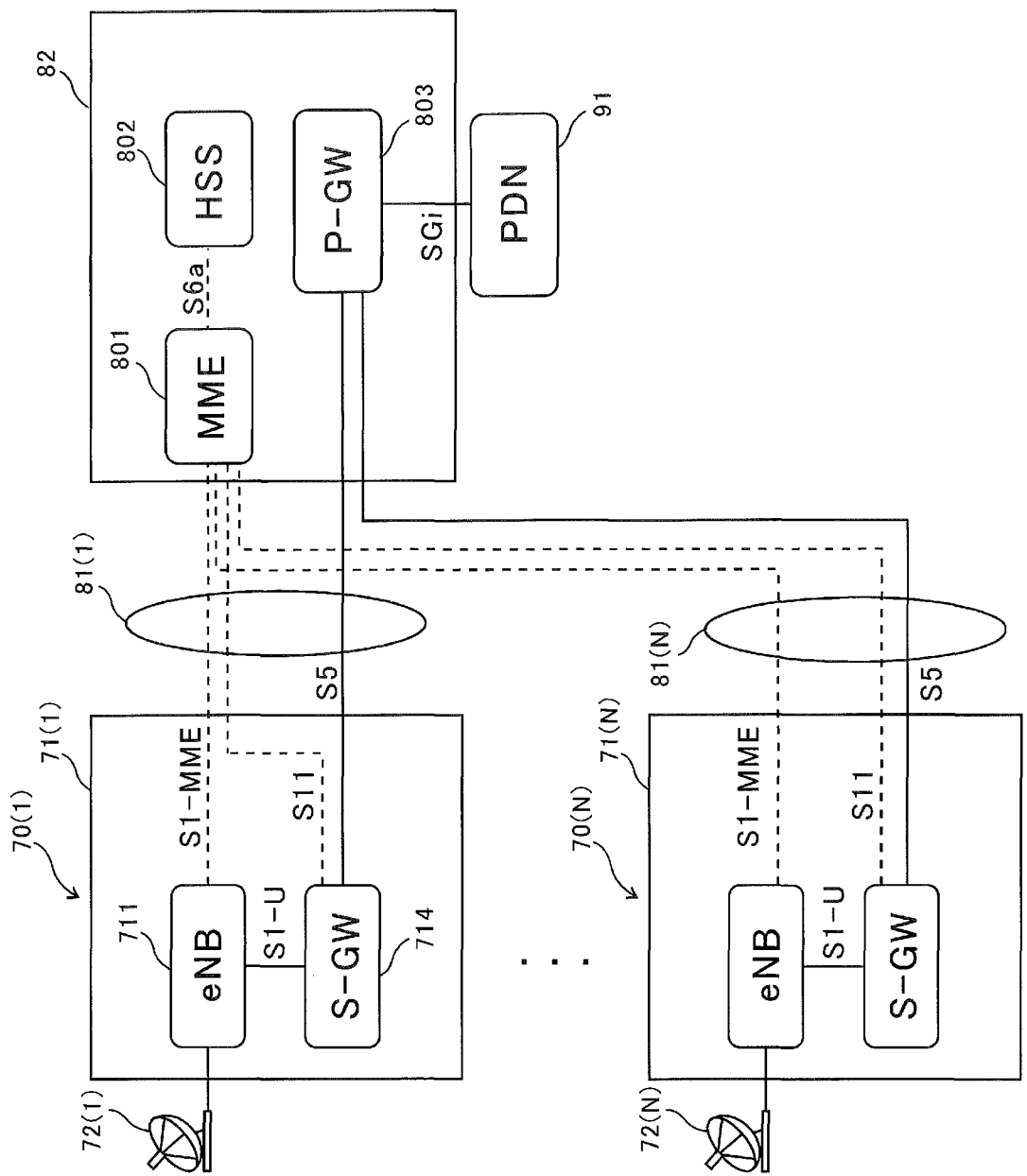
FIG. 17 is an illustration showing another example of a network configuration of a GW station and its surroundings in a communication system according to an embodiment.

FIG. 17 is an illustration showing another example of a network configuration of the GW station 70 and its surroundings in a communication system according to an embodiment. FIG. 17 is an example of a communication system including plural GW stations 70(1) to 70(N) fixedly disposed. In the configuration of FIG. 17, the description of the nodes common to those in FIG. 16 is omitted.

In FIG. 17, each of the GW station apparatuses 71(1) to 71(N) of the plural GW stations 70(1) to 70(N) is provided with the eNB 711 and the S-GW 714. On the other hand, a central site 82 of the core network is provided with the MME 712, the HSS 713 and the P-GW 715. Each of the GW station apparatuses 71(1) to 71(N) of the plural GW stations 70(1) to 70(N) is connected to the central site 82 of the core network via radio relay paths (for example, microwave relay paths) 81(1) to 81(N).

Figure 18:
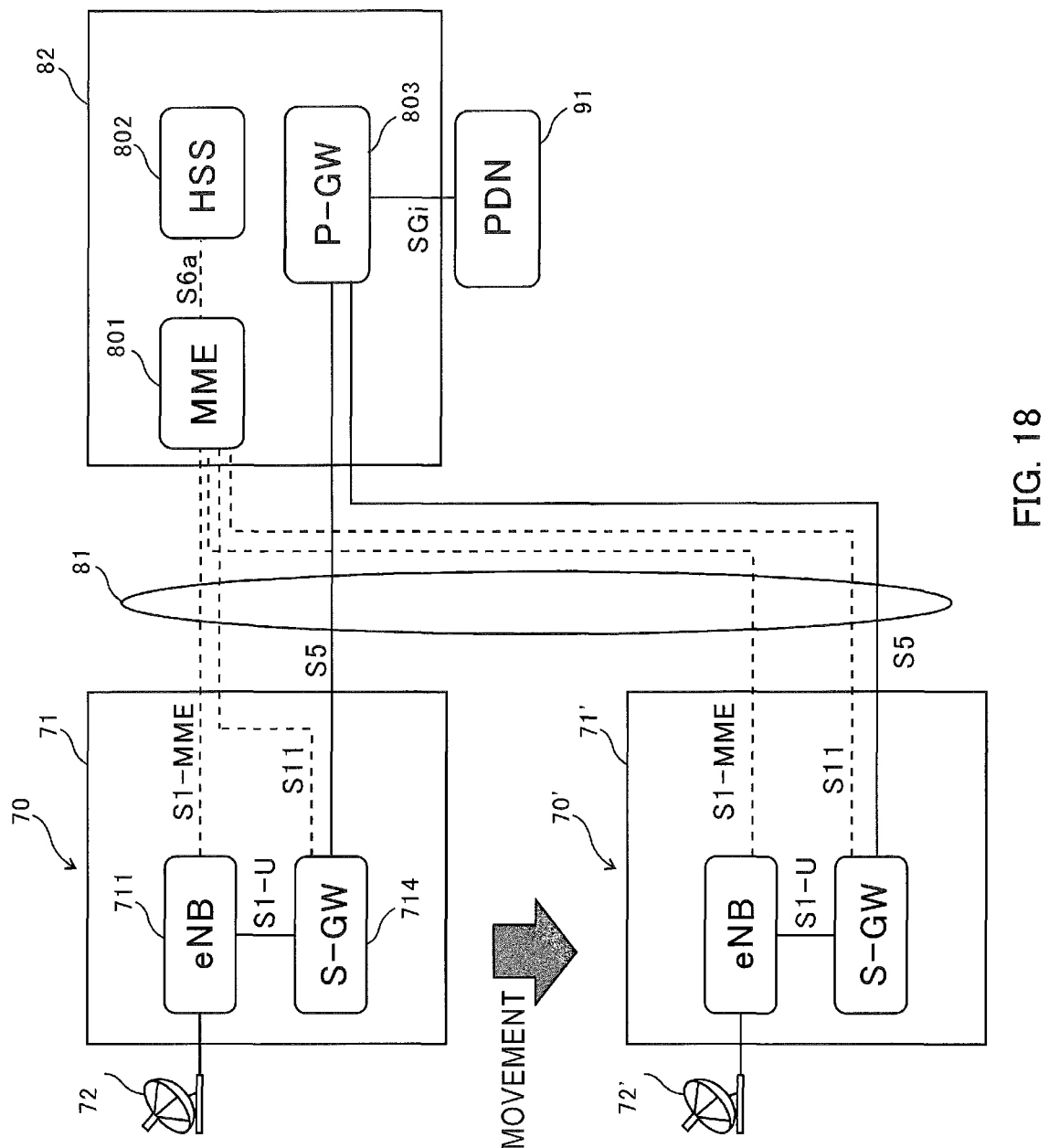
FIG. 18 is an illustration showing yet another example of a network configuration of a GW station and its surroundings in a communication system according to an embodiment.

FIG. 18 is an illustration showing yet another example of a network configuration of the GW station 70 and its surroundings in a communication system according to an embodiment. FIG. 18 is an example of a communication system including a single GW station 70 of a movable container type. In the configuration of FIG. 18, the description of the nodes common to those in FIG. 16 is omitted.

In FIG. 18, the GW station apparatus 71 of the GW station 70 is provided with the eNB 711 and the S-GW 714, and the central site 82 of the core network is provided with the MME 712, the HSS 713 and the P-GW 715. The GW station apparatus 71 of the GW station 70 is connected to the central site 82 of the core network via a radio relay path (for example, a microwave relay path) 81.

Figure 19:
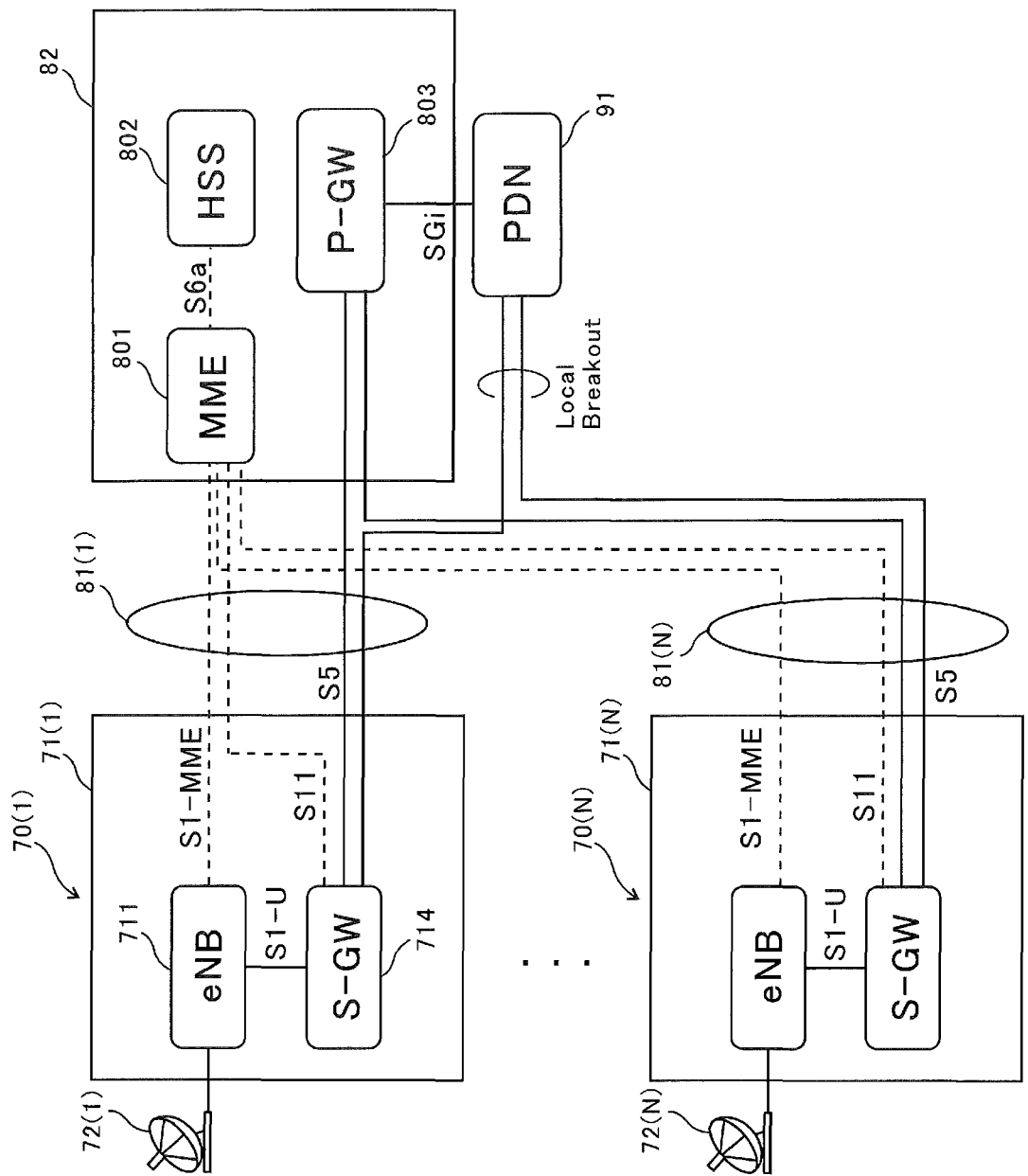
FIG. 19 is an illustration showing yet another example of a network configuration of a GW station and its surroundings in a communication system according to an embodiment.

FIG. 19 is an illustration showing yet another example of a network configuration of the GW station 70 and its surroundings in a communication system according to an embodiment. FIG. 19 is an example of a communication system including plural GW stations 70(1) to 70(N) fixedly disposed. In the configuration of FIG. 19, the description of the parts common to those in FIG. 16 and FIG. 17 is omitted.

The network configuration in FIG. 19 is different from the configuration in FIG. 17, and each of the plural GW stations 70(1) to 70(N) has a local breakout (Local Breakout) function for directly transferring a user plane data (user data) from the S-GW 714 to the PDN 91 such as the Internet without going through the P-GW 803.

Figure 20:
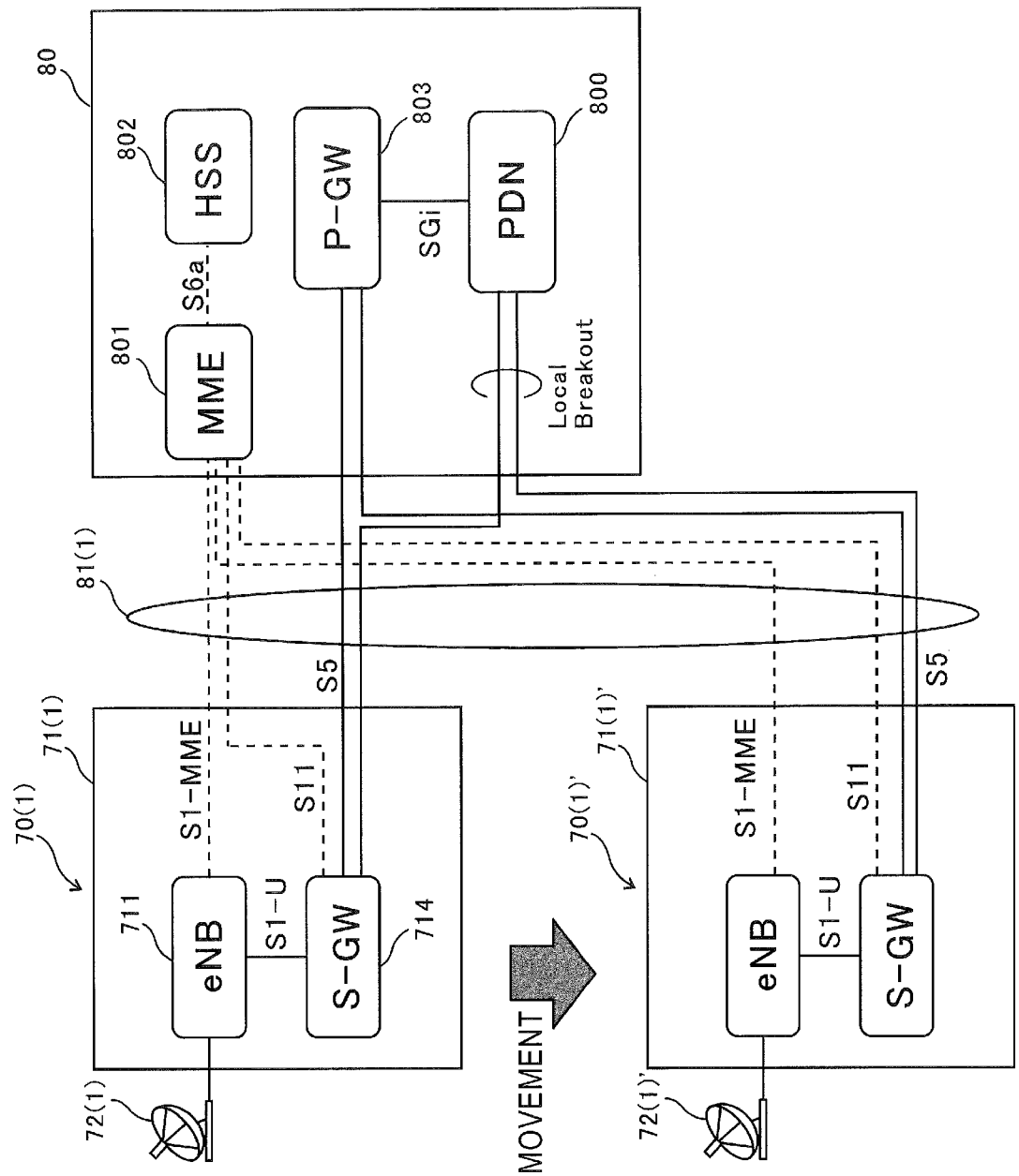
FIG. 20 is an illustration showing yet another example of a network configuration of a GW station and its surroundings in a communication system according to an embodiment.

FIG. 20 is an illustration showing yet another example of a network configuration of the GW station 70 and its surroundings in a communication system according to an embodiment. FIG. 20 is an example of a communication system including single GW stations 70(1) to 70(N) of a movable container type. In the configuration of FIG. 20, the description of the parts common to those in FIG. 16 and FIG. 18 is omitted.

The network configuration in FIG. 20 is different from the configuration in FIG. 18, and the movable GW station 70 has a local breakout (Local Breakout) function for directly transferring the user plane data (user data) from the S-GW 714 to the PDN 91 such as the Internet without going through the P-GW 803.

Figure 21:
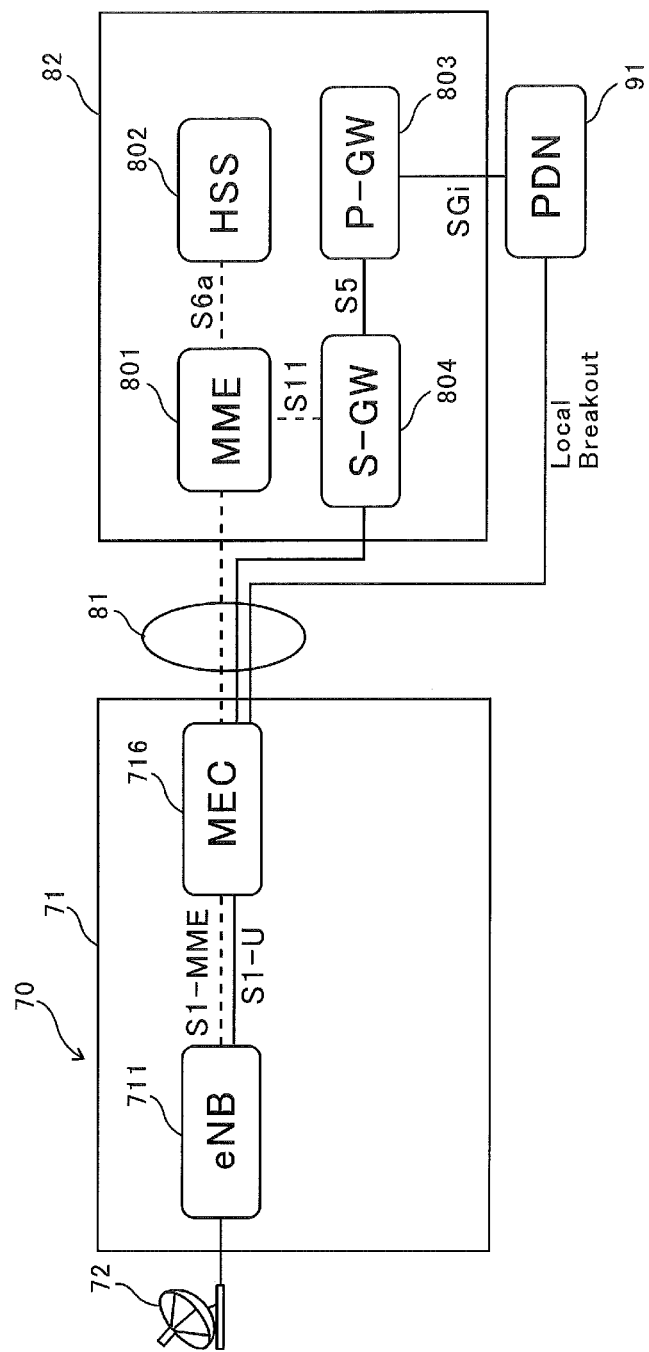
FIG. 21 is an illustration showing yet another example of a network configuration of a GW station and its surroundings in a communication system according to an embodiment.

FIG. 21 is an illustration showing yet another example of a network configuration of the GW station 70 and its surroundings in a communication system according to an embodiment. FIG. 21 is an example in which the GW station 70 has a MEC (Mobile Edge Computing) apparatus 716 as a data processing apparatus. In the configuration of FIG. 21, the description of the nodes common to those in FIG. 16 is omitted.

In FIG. 21, the GW station apparatus 71 of the GW station 70 is provided with the eNB 711 and the MEC 716, and the central site 82 of the core network is provided with the MME 801, the HSS 802, the P-GW 803 and the S-GW 804. The GW station apparatus 71 of the GW station 70 is connected to the central site 82 of the core network via a radio relay path (for example, a microwave relay path) 81.

In the configuration of FIG. 21, all traffic for communication via the eNB 711 passes through the MEC apparatus 716, and a local loopback and a local breakout (Local Breakout) are performed on user data (packets) transmitted and received by the MEC-compatible terminal apparatus. Herein, the local loopback is a process of transferring the data transmitted from the terminal apparatus to the MEC apparatus 716 via the eNB 711, performing a predetermined data processing on the user data (packet) received by the MEC apparatus 716, and returning the processed data to the terminal apparatus via the eNB 711 without transferring it to the central site 82 of the core network. The local breakout is a process of directly transferring the user plane data (user data) transmitted from the MEC apparatus 716 to the PDN 91 such as the Internet without going through the S-GW 804 and the P-GW 803.

It is noted that, in FIG. 16 to FIG. 21, although the example of the LTE (4G) network configuration has been described, the GW station and its surrounding network may be configured based on the next-generation network of the 5G or later. Further, in FIG. 16 to FIG. 21, although the configuration in which the relay communication station 11 of the HAPS 10 is the slave repeater and the GW station 70 is the master repeater having the eNode is described, the relay communication station 11 of the HAPS 10 may have a configuration of the GW station apparatus 71 including the eNode and the like in FIG. 16 to FIG. 21, and the GW station 70 may relay the backhaul line between the relay communication station 11 of the HAPS 10 and the core network 80.

As described above, according to the present embodiments, when the local propagation-loss increasing part 30 occurs in the radio propagation path of the feeder link between the HAPS 10 and the GW station 70 or when the occurrence of the propagation-loss increasing part 30 is predicted, the HAPS 10, the GW station 70 or both of them are moved to the predetermined target position where the deterioration of the communication quality due to the propagation-loss increasing part 30 can be suppressed or avoided. Since this movement can suppress or avoid the deterioration of the communication quality of the feeder link due to the increase of local propagation loss (signal attenuation) in the radio propagation path of the feeder link, the deterioration of the communication quality of the service link can be suppressed.

Further, according to the present embodiment, the movement of the HAPS 10 to the predetermined target position is performed within the range in which the position and shape of the footprint 100F on the ground or on the sea of the cell 100C of the service link can be maintained. Alternatively, after or during the movement of the HAPS 10 to the predetermined target position, the directional beam of the service link is controlled so as to maintain the position and shape of the footprint 100F of the cell 100C of the service link in the position and shape of the footprint before the movement of the HAPS 10. Therefore, when the HAPS 10 is moved to the predetermined target position, the positions and shapes of the cell 100C of the service link and its footprint 100F can be maintained.

It is noted that, the process steps and configuration elements of the relay communication station of the communication relay apparatus such as the HAPS, the feeder station, the gateway station, the management apparatus, the monitoring apparatus, the remote control apparatus, the server, the terminal apparatus (user apparatus, mobile station, communication terminal), the base station, the base station apparatus, the RRH, the BBU and the common BBU described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, radio relay station, feeder station, gateway station, base station, base station apparatus, radio-relay station apparatus, terminal apparatus (user apparatus, mobile station, communication terminal), management apparatus, monitoring apparatus, remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10 HAPS (communication relay apparatus)
11 relay communication station
12, 12(1), 12(2) antenna for feeder link (FL antenna)
30 propagation-loss increasing part
60 terminal apparatus
70, 70(1), 70(2) gateway station (GW station)
70' gateway station (GW station) after moving
71 GW station apparatus
72 antenna for feeder link (GW antenna)
100C three dimensional cell
100F foot print

The invention claimed is:

1. An aerial-staying type communication relay apparatus, comprising:
    a feeder-link communication section that performs a radio communication of a feeder link to and from a gateway station;
    a service-link communication section that performs a radio communication of a service link to and from a terminal apparatus;
    a drive section that moves the communication relay apparatus; and
    a drive control section that controls so as to move the communication relay apparatus to a position capable of suppressing or avoiding a deterioration of communication quality due to a local propagation-loss increasing part in a radio propagation path of the feeder link between the gateway station and the communication relay apparatus, when the propagation-loss increasing part occurs in the radio propagation path, or when an occurrence of the propagation-loss increasing part is predicted,
    wherein the communication relay apparatus moves within a range capable of maintaining a position and shape of a footprint on the ground or on the sea of a cell of the service link.

2. The communication relay apparatus according to claim 1,
    wherein the communication relay apparatus controls a directional beam of the service-link communication section so as to maintain a position and shape of a footprint on the ground or on the sea of a cell of the service link in a position and shape of the footprint before a movement of the communication relay apparatus, after the movement of the communication relay apparatus or during the movement of the communication relay apparatus.

3. The communication relay apparatus according to claim 1,
    wherein the communication relay apparatus acquires weather information that affects the occurrence of the local propagation-loss increasing part in the radio propagation path of the feeder link, and moves to a position capable of suppressing or avoiding the deterioration of the communication quality in the radio propagation path of the feeder link, based on the weather information.

4. The communication relay apparatus according to claim 1,
    wherein the communication relay apparatus detects or predicts a temporal fluctuation or spatial fluctuation in a weather affecting the occurrence of the local propagation-loss increasing part in the radio propagation path of the feeder link, and moves to a position capable of suppressing or avoiding the deterioration of the communication quality in the radio propagation path of the feeder link, based on a result of the detection or prediction of the temporal fluctuation or spatial fluctuation in the weather.

5. The communication relay apparatus according to claim 4,
    wherein the communication relay apparatus measures a propagation loss or a radio-signal attenuation amount in a radio propagation path of plural links, including the feeder link to and from the gateway station and a link to and from a radio apparatus disposed on the ground or on the sea so as to be located at a location different from the gateway station, and detects or predicts the spatial fluctuation in the weather based on a result of the measurement.

6. The communication relay apparatus according to claim 1,
    wherein the communication relay apparatus measures a propagation loss or a radio-signal attenuation amount in the radio propagation path of the feeder link between the gateway station and the communication relay apparatus, and moves to a position capable of suppressing or avoiding the deterioration of the communication quality in the radio propagation path of the feeder link, based on a result of the measurement.

7. The communication relay apparatus according to claim 1,
    wherein the communication relay apparatus measures a radio-signal attenuation amount, a propagation loss or a communication quality of the feeder link, at a destination to which the communication relay apparatus moves.

8. The communication relay apparatus according to claim 1,
    wherein, when another aerial-staying type communication relay apparatus is located around the communication relay apparatus, the communication relay apparatus moves in cooperation with the other communication relay apparatus so that the communication relay apparatus and the other communication relay apparatus are optimally disposed with each other.

9. The communication relay apparatus according to claim 1,
wherein, when another aerial-staying type communication relay apparatus of a different management and operation entity is located around the communication relay apparatus, the communication relay apparatus instructs a moving destination to the other communication relay apparatus.

10. A gateway station for performing a radio communication with an aerial-staying type communication relay apparatus, comprising:
a network communication section that performs a communication to and from a communication network;
a feeder-link communication section that performs a radio communication of a feeder link to and from the communication relay apparatus;
a drive section that moves the gateway station; and
a drive control section that controls so as to move the gateway station to a position capable of suppressing or avoiding a deterioration of communication quality due to a local propagation-loss increasing part in a radio propagation path of the feeder link between the gateway station and the communication relay apparatus, when the local propagation-loss increasing part occurs in the radio propagation path, or when an occurrence of the propagation-loss increasing part is predicted,
wherein the communication relay apparatuses in connection are plural, the communication relay apparatuses performing a feeder-link radio communication to and from the gateway station; and
wherein the gateway station moves to an optimum position for the plural communication relay apparatuses in connection.

11. The gateway station according to claim 10,
wherein, when another aerial-staying type communication relay apparatus of a different management and operation entity is located around the communication relay apparatus in connection performing a feeder-link radio communication with the gateway station, the gateway station moves to an optimum position for both of the communication relay apparatus in connection and the other communication relay apparatus.

12. The gateway station according to claim 10,
wherein the gateway station acquires weather information that affects the occurrence of the local propagation-loss increasing part in the radio propagation path of the feeder link, and moves to a position capable of suppressing or avoiding the deterioration of the communication quality in the radio propagation path of the feeder link, based on the weather information.

13. The gateway station according to claim 10,
wherein the gateway station detects or predicts a temporal fluctuation or spatial fluctuation in a weather affecting the occurrence of the local propagation-loss increasing part in the radio propagation path of the feeder link, and moves to a position capable of suppressing or avoiding the deterioration of the communication quality in the radio propagation path of the feeder link, based on a result of the detection or prediction of the temporal fluctuation or spatial fluctuation in the weather.

14. The gateway station according to claim 10,
wherein the gateway station measures a propagation loss or a radio-signal attenuation amount in the radio propagation path of the feeder link between the gateway station and the communication relay apparatus, and moves to a position capable of suppressing or avoiding the deterioration of the communication quality in the radio propagation path of the feeder link, based on a result of the measurement.

15. The gateway station according to claim 10,
wherein the gateway station measures a radio-signal attenuation amount, a propagation loss, or a communication quality of the feeder link, at a destination to which the gateway station moves.

16. A communication system comprising:
a communication relay apparatus that includes:
    a feeder-link communication section that performs a radio communication of a feeder link to and from a gateway station;
    a service-link communication section that performs a radio communication of a service link to and from a terminal apparatus;
    a drive section that moves the communication relay apparatus; and
    a drive control section that controls so as to move the communication relay apparatus to a position capable of suppressing or avoiding a deterioration of communication quality due to a local propagation-loss increasing part in a radio propagation path of the feeder link between the gateway station and the communication relay apparatus, when the propagation-loss increasing part occurs in the radio propagation path, or when an occurrence of the propagation-loss increasing part is predicted, wherein the communication relay apparatus moves within a range capable of maintaining a position and shape of a footprint on the ground or on the sea of a cell of the service link; and
the gateway station according to claim 14, wherein the communication system moves at least one of the communication relay apparatus and the gateway station to a position capable of suppressing or avoiding the deterioration of communication quality due to the propagation-loss increasing part in the radio propagation path of the feeder link.

17. The communication system according to claim 16,
wherein at least one of the communication relay apparatus and the gateway station is plural, and
wherein the communication system simultaneously suppresses or avoids the deterioration of communication quality due to the propagation-loss increasing part in radio propagation paths of plural feeder links.

18. The communication system according to claim 16, further comprising a remote control apparatus that transmits control information for moving to a position capable of suppressing or avoiding the deterioration of communication quality due to the propagation-loss increasing part in the radio propagation path of the feeder link, to at least one of the communication relay apparatus and the gateway station.

19. The communication relay apparatus according to claim 1, wherein the communication relay apparatus controls a directional beam of the feeder-link communication section so as to direct to the gateway station by mechanically driving an antenna for feeder link or processing a signal in the feeder link.

20. The gateway station according to claim 10,
wherein the gateway station controls a directional beam of the feeder-link communication section so as to direct to the communication relay apparatus by mechanically driving an antenna for feeder link or processing a signal in the feeder link.

* * * * *